United States Patent [19]

Carroll et al.

[11] Patent Number: 5,473,694

[45] Date of Patent: Dec. 5, 1995

[54] SYNCHRONIZATION OF NONAUTONOMOUS CHAOTIC SYSTEMS

[75] Inventors: Thomas L. Carroll; Louis M. Pecora, both of Alexandria, Va.; James F. Heagy, Greenbelt, Md.

[73] Assignee: The United States of America as represented by the Secretary of the Navy, Washington, D.C.

[21] Appl. No.: 267,696

[22] Filed: Jun. 29, 1994

[51] Int. Cl.$^6$ .............................. H04L 9/12; H04L 7/033
[52] U.S. Cl. .............................. 380/48; 375/364; 375/367
[58] Field of Search .............................. 380/48; 375/364, 375/367

[56] References Cited

U.S. PATENT DOCUMENTS

| | | |
|---|---|---|
| 3,439,279 | 4/1969 | Guanella . |
| 3,947,634 | 3/1976 | Betts . |
| 4,301,537 | 11/1981 | Roos . |
| 4,606,041 | 8/1986 | Kevin .............................. 375/1 |
| 4,790,013 | 12/1988 | Kage .............................. 380/48 |
| 4,799,259 | 1/1989 | Ogrodski . |
| 4,827,514 | 5/1989 | Ziolko et al. .............................. 380/48 |
| 4,893,339 | 1/1990 | Brights et al. . |
| 5,007,087 | 4/1991 | Bernstein et al. . |
| 5,048,086 | 9/1991 | Bianco et al. . |
| 5,245,660 | 9/1993 | Pecora et al. . |
| 5,379,346 | 1/1995 | Pecora et al. .............................. 380/48 |

OTHER PUBLICATIONS

K, Murali et al., "Synchronizing Chaos in Driven Chua's Circuit", International Journal of Bifurcation and Chaos, vol. 3, No. 4 (1993), pp. 1057–1066.

K. Murali et al., "Transmission of Signals by Synchronization in A Chaotic Van Der Pol–Duffing Oscillator", Sep. 1993, Physical Review E, vol. 48, No. 3 pp. R1624–R1626.

U. Tietze.Ch.Schenk, "Electronic Circuits Design and Applications", pp. 861–869, Springer–Verlag, Berlin (1991).

Jacek M. Kowalski et al., "Asymptotically Synchronous Chaotic Orbits in Systems of Excitable Elements", Physical Review A, vol. 42, No. 10, 15 Nov. 1990, pp. 6260–6263.

Herbert G. Winful et al., "Synchronized Chaos and Spatiotemporal Chaos in Arrays of Coupled Lasers", Physical Review Letters, vol. 65, No. 13, Sep. 24, 1990, pp. 1575–1578.

James P. Crutchfield, "Chaos", Scientific American, Dec. 1986, pp. 46–57.

Alan V. Oppenhein et al., "Signal Processing in the Context of Chaotic Signals", presented in 1992, IEEE International Conference on Acoustics, Speech and Signal Processing, pp. IV–117 thru–120.

Lj. Kocarev et al., "Experimental Demonstration of Secure Communications VIA Chaotic Synchronization", International Journal of Bifurcation and Chaos, vol. 2, No. 3 (1992), pp. 709–713.

U. Parlitz et al., "Transmission of Digital Signals by Chaotic Synchronization", International Journal of Bifurcation and Chaos, vol. 2, No. 4, (1992), pp. 973–977.

(List continued on next page.)

Primary Examiner—Gilberto Barrón, Jr.
Attorney, Agent, or Firm—Thomas E. McDonnell; Daniel Kalish

[57] ABSTRACT

A cascaded synchronized system includes a nonlinear transmitter, a nonlinear cascaded receiver, a phase-detector/controller coupled to the receiver, and a signal generator also coupled to the receiver. The transmitter is responsive to an externally generated transmitter forcing signal for producing and transmitting a chaotic communications signal containing phase information. The cascaded receiver is responsive to a receiver forcing signal and to the chaotic communications signal for producing a chaotic receiver output signal containing phase information. The phase-detector/controller is responsive to the chaotic communications signal and to the receiver output signal for producing a correction signal. The signal generator is responsive to the correction signal for producing the receiver forcing signal in phase with and having the same frequency as the transmitter forcing signal.

21 Claims, 19 Drawing Sheets

OTHER PUBLICATIONS

Kevin M. Cuomo et al., "*Circuit Implementation of Synchronized Chaos with Applications to Communications*", Physical Review Letters, vol. 71, No. 1, Jul. 5, 1993, pp. 65–68.

Alexander A. Chernikov et al., "*Chaos: How Regular Can it Be?*", Physics Today, Nov. 1988, pp. 27–35.

Alan Wolf et al., "*Determining Lyapunov Exponents from a Time Series*", Physica 16D, (1985) pp. 285–317.

Y. S. Tang et al., "*Synchronization and Chaos*", IEEE Transctions on Circuits and Systems, vol. CAS–30, No. 9, Sep. 1983, pp. 620–626.

Greg M. Bernstein et al., "Secure Random Number Generation using Chaotic Circuits", IEEE, (1989) pp. 0640–0644.

Thomas L. Carroll et al., "Synchronizing Chaotic Systems", Paper presented at the SPIE, 14–15 Jul. 1993, San Diego, Calif., vol. No. 2038, Chaos in Communictions (1993).

Earle R. Hunt et al., "Keeping Chaos at Bay", IEEE Spectrum Nov. 1993, pp. 32–36.

Louis M. Pecora, "*Synchronization in Chaotic Systems*", Physical Review Letters, vol. 64, No. 8, 19 Feb. 1990, pp. 821–824.

Louis M. Pecora et al., "*Driving Systems with Chaotic Signals*", Physical Review A, vol. 44, No. 4, 15 Aug. 1991, pp. 2374–2383.

William L. Ditto et al., "Mastering Chaos", Scientific American, Aug. 1993, pp. 78–84.

Robert Langreth, "*Engineering Dogma Gives Way to Chaos*", Science, vol. 252, 10 May 1991, pp. 776–778.

Lou Pecora et al., "Driving Nonlinear Systems with Chaotic Signals" Proceedings of the 1st Experimental Chaos Conference.

Lou Pecora et al., "Synchronized Chaotic Signals and Systems", Proceedings of ICASSP Conference, San Francisco, Calif., Mar. 9.

Thomas L. Carroll et al., "*Communicating with Chaos*", 1993 NRL Review, May 1993, pp. 75–82.

Thomas L. Carroll et al. "Synchronizing Chaotic Circuits", IEEE Transactions on Circuits and Systems, vol. 38, No. 4, Apr. 1991.

Thomas L. Carroll et al, "*A Circuit For Studying the Synchronization of Chaotic Systems*", International Journal of Bifurcation and Chaos, vol. 2, No. 3, (1992), pp. 659–666.

Thomas L. Carroll et al., "*Cascading Synchronized Chaotic Systems*", Physica D, (1993) pp. 126–140.

Joseph Neff, "Circuits That Get Chaos in Sync", Scientific American, Aug. 1993, pp. 120–122.

SYNCHRONIZATION OF NONAUTONOMOUS CHAOTIC SYSTEMS

CROSS REFERENCE TO RELATED PATENTS AND APPLICATIONS

This application is related to commonly assigned U.S. patent application Ser. No. 07/656,330 filed Feb. 19, 1991 (now U.S. Pat. No. 5,245,660) by Louis M. Pecora and Thomas L. Carroll and having Navy Case No. 72,593. This application is also related to commonly assigned and co-pending U.S. application Ser. No. 08/129,495 filed Sep. 30, 1993 by Louis M. Pecora and Thomas L. Carroll and having Navy case no. 74,222. Both U.S. Pat. No. 5,245,660 and U.S. application Ser. No. 08/129,495 are incorporated herein by reference.

FIELD OF THE INVENTION

The present invention relates to periodically driven dynamical systems and, in particular, to the driving of periodically forced systems for producing synchronized chaotic signals.

BACKGROUND OF THE INVENTION

The synchronization of remote systems has application in communications and related fields. Conventional synchronization theory applies to systems exhibiting linear behavior (stationary) or cyclic nonlinear behavior.

Nonlinear systems operating in the chaotic regime, that is, evolving chaotically, are characterized by extreme sensitivity to initial conditions and by broadband spectra. Extreme sensitivity to initial conditions means that two identical chaotic systems started under slightly different initial conditions quickly evolve to vastly different and uncorrelated states even though the overall patterns of behavior will remain the same. In bounded systems, the states do not diverge indefinitely, but repeatedly fold back. Lyapunov exponents measure such divergence and a system evolving chaotically is synonymous with a system having at least one positive Lyapunov exponent.

The evolution of a chaotic system is nonperiodic (there are no cycles of repetition whatsoever), becomes increasingly difficult to predict over time, and often has a complex, fractal character. Synchronization of remote chaotic systems has application in many communication related fields, such as broadband, spread-spectrum, multiplexing, security, pattern recognition, encryption, coding communications, in control devices relying on wide-frequency-band synchronized signals, phase locking, massively parallel systems, robotics, and physiology.

U.S. Pat. No. 5,245,660 to Pecora and Carroll teaches production of synchronized chaotic signals by a transmitter and receiver, the transmitter driving the receiver with a chaotic communications signal. The receiver includes a duplicate of a stable part of the transmitter. Currently co-pending U.S. application Ser. No. 08/129,495 by Pecora and Carroll extends this idea to cascaded nonlinear systems in which the receiver output signal is synchronized with the chaotic communications signal that drives the receiver. In such a cascaded system, a remote receiver has access to the chaotic communications drive signal. The overall system can be used for encryption of information in the chaotic communications drive signal and recovery of the information by the cascaded receiver.

If the transmitter and receiver are nonautonomous, that is, forced by externally provided periodic signals, then the external forcing signals might have differing phase and frequency, thus making it impossible to synchronize such systems by traditional phase locking techniques.

SUMMARY OF THE INVENTION

It is an object of this invention to provide nonautonomous, nonlinear systems for producing synchronized signals.

It is another object of the present invention to provide nonautonomous, nonlinear remote systems for producing synchronized signals.

It is a further object of the present invention to transmit information using cascaded synchronizable nonautonomous chaotic systems.

The above objects can be accomplished by a cascaded synchronized system that includes a nonlinear transmitter, a nonlinear cascaded receiver, a phase-detector/controller coupled to the receiver, and a signal generator also coupled to the receiver. The transmitter is responsive to an externally generated transmitter forcing signal for producing and transmitting a chaotic communications signal containing phase information. The cascaded receiver is responsive to a receiver forcing signal and to the chaotic communications signal for producing a chaotic receiver output signal containing phase information. The phase-detector/controller is responsive to the chaotic communications signal and to the receiver output signal for producing a correction signal. The signal generator is responsive to the correction signal for producing the receiver forcing signal in phase with and having the same frequency as the transmitter forcing signal.

Since the receiver forcing signal has the same frequency and is in phase with the transmitter forcing signal, the receiver output signal is synchronized with the chaotic communications signal and therefore, the nonautonomous nonlinear transmitter and receiver systems produce synchronized signals. The receiver can be a remote system with respect to the transmitter. The system can be used to transmit information by encrypting the information in the chaotic communications signal and using the cascaded receiver to recover the information.

These and other objects, features and advantages of the present invention are described in or apparent from the following detailed description of preferred embodiments.

BRIEF DESCRIPTION OF THE DRAWINGS

The preferred embodiments will be described with reference to the drawings, in which like elements have been denoted throughout by like reference numerals, and wherein.

DETAILED DESCRIPTION OF THE PREFERRED EMBODIMENT

Figure 1:
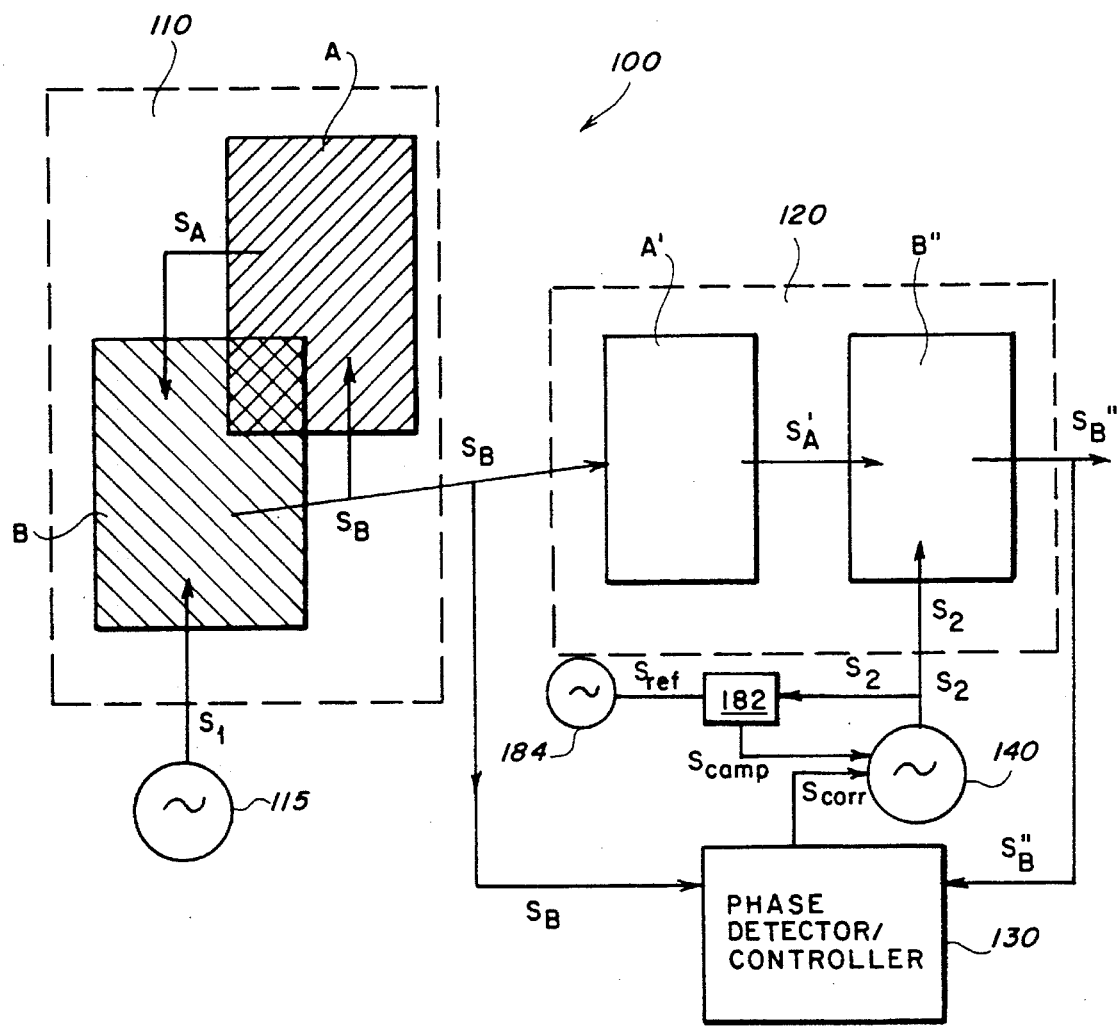
FIG. 1 is a general block diagram of a two-stage cascaded non-autonomous synchronized system.

Referring now to the drawings, a cascaded synchronized system 100 for producing synchronized communication signals $S_B$ and $S_{B''}$ is shown in FIG. 1. The system 100 is a tangible system that can be of any form. Examples of signals, such as signals $S_B$ and $S_{B''}$ which can be associated with the system 100 are electrical, optical or other electromagnetic signals, pressure, force, temperature, chemical concentration, and population.

Physical systems or subsystems of relevance herein may be mathematically modeled as having state variables $u = (u_1, u_2, \ldots u_n)$ which deterministically evolve over time according to a system of differential equations $$du/dt = f(u, t), \tag{1}$$

where the function f may or may not depend explicitly on time. It is not necessary for the practice of this invention to know the precise system of differential equations (1) characterizing the system or subsystem in question, except to the extent that certain properties as specified below are satisfied.

A system or subsystem (not shown) is nonautonomous if its time evolution explicitly depends on time. It is nonlinear if the time evolution dependence of some of the state variables is nonlinear. For example, a nonlinear circuit is a circuit in which the current and voltage in any element that results from two sources of energy acting together is not equal to the sum of currents or voltages that result from each of the sources acting alone.

The cascaded synchronized system 100 includes a nonlinear nonautonomous transmitter 110 for producing an output signal $S_B$. The nonautonomous (evolutionary time dependence) property arises from the dependence of transmitter 110 on an externally generated transmitter forcing signal $S_1$.

As discussed earlier and known to persons of ordinary skill in the art, Lyapunov exponents (also known in the art as "characteristic exponents") characterize a system's rate of time divergence. This topic is discussed further in Wolf et al., *Determining Lyapunov Exponents from a Time Series*, Physica, Vol. 16D, p. 285 et seq. (1985). A system will have a complete set (or spectrum) of Lyapunov exponents, each of which is the average exponential rate of convergence (if negative) or divergence (if positive) of nearby orbits in phase space as expressed in terms of appropriate variables and components. If all the Lyapunov exponents of a system are negative, then the same system started under slightly different initial conditions will converge over time to the same values, which values may vary over time.

Figure 2:
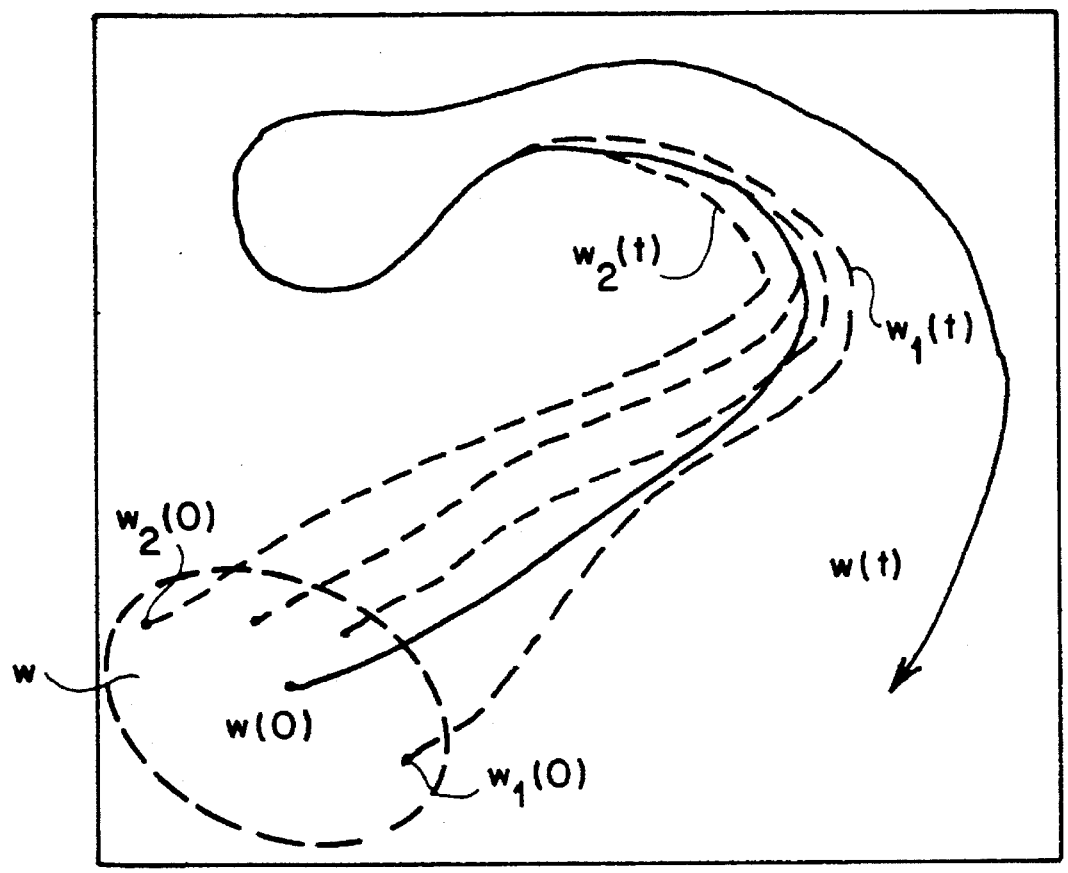
FIG. 2 shows the evolution of a system that has all negative Lyapunov exponents.

Referring now to FIG. 2, the time evolution of a system (not shown) having all negative Lyapunov exponents in a neighborhood W is shown for varying initial values. Although the initial values $w_1(0)$, $w_2(0)$ of the system might vary, the trajectories $w_1(t)$ and $w_2(t)$ converge to the same trajectory $w(t)$ since the Lyapunov exponents in the neighborhood W are all negative.

On the other hand, if at least one of the Lyapunov exponents of a system or subsystem (not shown) is positive, then the same system started with slightly different initial conditions will not converge, and the system behaves chaotically. It is known by persons of ordinary skill in the art that "in almost all real systems there exist ranges of parameters or initial conditions for which the system turns out to be a system with chaos . . . " Chernikov et al., *Chaos: How Regular Can It Be?*, 27 Phys. Today 27, 29 (November 1988).

The term "conditional Lyapunov exponent" is used herein as relevant to stability. A Nonlinear system or subsystem (not shown) driven by a drive signal v may be modeled as evolving according to the system of differential equations $$d/dt = h(w, v). \tag{2}$$

The question of stability arises when we ask: Given a trajectory $w(t)$ generated by the system of equation (2) for a particular drive signal v, when is $w(t)$ immune to small differences in initial conditions, i.e., when is the final trajectory unique, in some sense?.

Consider two responses w and w' started at slightly different points in phase space $w(0)$ and $w'(0)$, where $$w'(0) = w(0) + \Delta w(0). \tag{3}$$

We want to know the conditions under which $w'(t) \to w(t)$ as $t \to \infty$. Assume that $\Delta w(0)$ is small and subtract the equations of motion for w' and w. This gives a set of equations of motion for $\Delta w$:

$$d\Delta w/dt = D_w h(w, v) \cdot \Delta w + W(w, v), \tag{4}$$

where $D_w h(w, v)$ is the linear operator known as the Jacobian of h with respect to w, and $W(w, v)$ represents the remainder of the terms. The question of stability is now, when does $\Delta w \to 0$?. This question of stability is further discussed in L. M. Pecora and T. L. Carroll, "Synchronization in Chaotic Systems," Physical Review Letters, 64, 831 (1990), which article is incorporated herein by reference.

Typically, linear stability analysis employs the fundamental theorem of linear stability: The null solution (x=0) of the nonlinear non-stationery system $$dx/dt = A(t) \cdot x + B(x, t), \tag{5}$$

where A is a linear operator and $B(0,t)=0$ for all values of t, is uniformly asymptotically stable if the following three conditions are satisfied:

$$\text{(i)} \lim_{x \to 0} \left[ \frac{B(x,t)}{x} \right] = c \qquad (6)$$

holds uniformly with respect to t;
(ii) A(t) is bounded for all values of t; and
(iii) the null solution of the linear system $$dx/dt = A(t) \cdot x \qquad (7)$$

is uniformly asymptotically stable.

The above fundamental theorem of linear stability means that if conditions (i)–(iii) are satisfied, then there will always be a non-empty set of initial conditions that will asymptotically converge to zero. This compares directly with the equations for the response differences by replacing x by Δw, A by $D_w h$, and t by v.

For most dynamical systems (systems that evolve over time), conditions (i) and (ii) are readily satisfied. If we can establish condition (iii), we have the results that regardless of the drive signal v, the w system will always settle into the same trajectory and the points on that trajectory will eventually be at the same place at the same time for any initial condition near w(0).

The conditional Lyapunov exponents are defined as the Lyapunov exponents of the system of Equation (2) dependent on the drive signal v. When all conditional Lyapunov exponents with respect to a given drive signal v are negative, then condition (iii) is satisfied, and the w system is considered stable with respect to the drive signal v.

Referring back to FIG. 1, the properties of the transmitter 110 will now be given. As stated earlier, the transmitter 110 is a nonlinear nonautonomous system driven by a transmitter forcing signal $S_1$ for producing signal $S_B$. The transmitter forcing signal $S_1$ is produced by a signal generator 115 and is periodic. Transmitter 110 evolves chaotically, that is, it has at least one positive Lyapunov exponent. The communications signal $S_B$ is called "chaotic" since it is produced by a system 110 that evolves chaotically.

The transmitter 110 includes 2 interdependent subsystems A and B which may or may not overlap in part but which together constitute all essential aspects of the nonlinear system 110. Subsystems A and B are non-overlapping in the sense that neither subsystem A nor subsystem B is contained within the other subsystem. At least part of subsystem A is external to subsystem B and at least part of subsystem B is external to subsystem A. Subsystem A drives subsystem B with signal $S_A$ and subsystem B drives subsystem A with signal $S_A$. Subsystem B is also forced by the transmitter forcing signal $S_1$. Using the above definition of stable, subsystem A is stable with respect to signal $S_B$, and subsystem B is stable with respect to signals $S_A$ and $S_1$. I.e., subsystem A has all negative conditional Lyapunov exponents with respect to signal $S_B$, and subsystem B has all negative conditional Lyapunov exponents with respect to signals $S_A$ and $S_1$. In general, either subsystem A or subsystem B or both can be forced by an external periodic forcing signal such as the transmitter forcing signal $S_1$.

Figure 3:
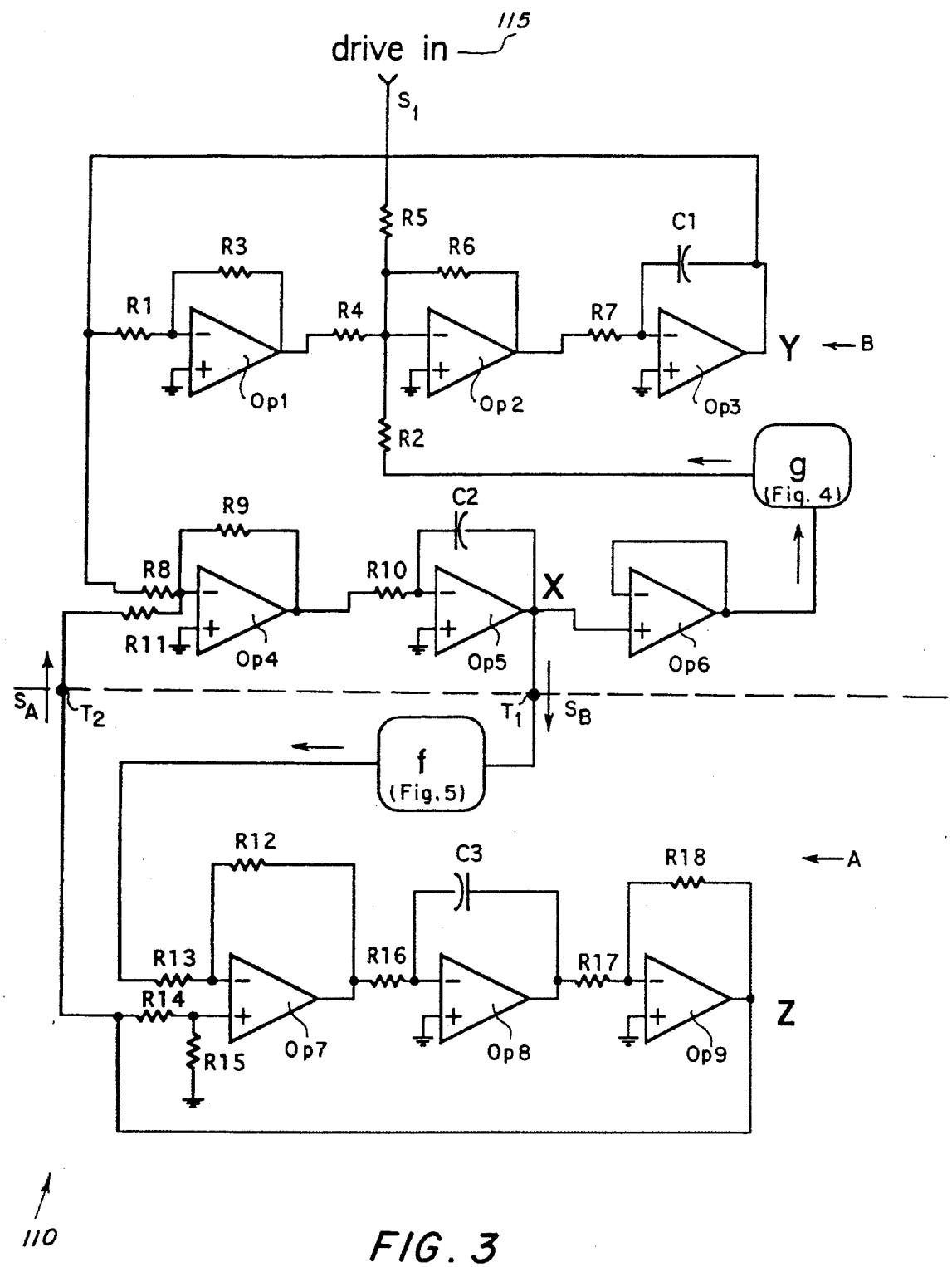
FIGS. 3, 4 and 5 illustrate the circuit details of a transmitter of FIG. 1.
Figure 4:
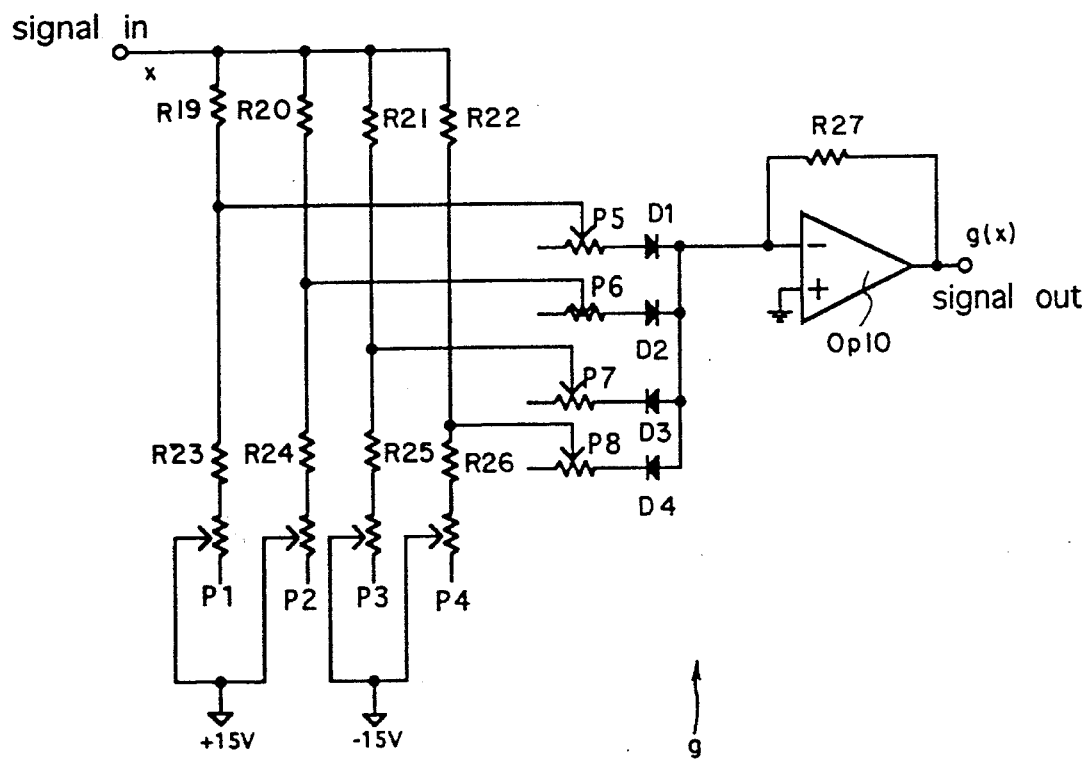
Figure 5:
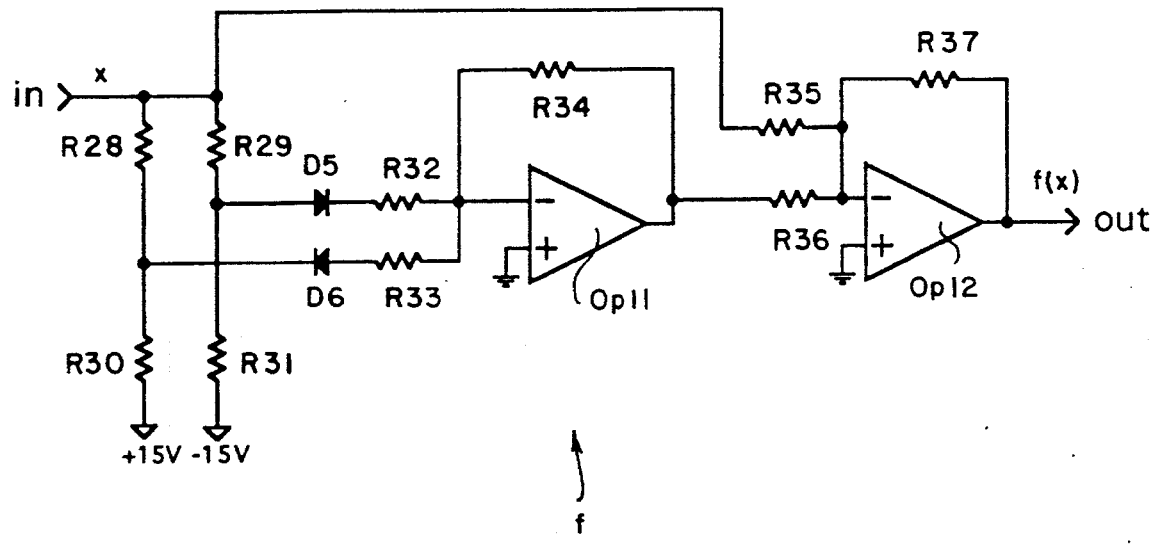

The circuit details of an electronic example of transmitter 110 are shown in FIGS. 3, 4 and 5. This circuit 110 includes the following particular circuit elements:

| | |
|---|---|
| Resistor R1 = 10 kΩ | Resistor R2 = 39.2 kΩ |
| Resistor R3 = 10 kΩ | Resistor R4 = 10 kΩ |
| Resistor R5 = 10 kΩ | Resistor R6 = 10 kΩ |

-continued

| | |
|---|---|
| Resistor R7 = 100 kΩ | Resistor R8 = 1 MΩ |
| Resistor R9 = 1 MΩ | Resistor R10 = 100 kΩ |
| Resistor R11 = 1 MΩ | Resistor R12 = 100 kΩ |
| Resistor R13 = 100 kΩ | Resistor R14 = 100 kΩ |
| Resistor R15 = 5.2 kΩ | Resistor R16 = 100 kΩ |
| Resistor R17 = 100 kΩ | Resistor R18 = 1 MΩ |
| Capacitor C1 = 1 nF | Capacitor C2 = 1 nF |
| Capacitor C3 = 1 nF | |

Resistor tolerances are preferably 1% or better and all capacitors are preferably 5% mica capacitors. The system also includes operational amplifiers Op1, Op2, Op3, Op4, Op5, Op6, Op7, Op8 and Op9, all of which are 741 type amplifiers.

The circuit details of the circuit g of FIG. 3 is depicted in the circuit diagram of FIG. 4, having the following particular elements:

| | |
|---|---|
| Resistor R19 = 100 kΩ | Resistor R20 = 100 kΩ |
| Resistor R21 = 100 kΩ | Resistor R22 = 100 kΩ |
| Resistor R23 = 680 kΩ | Resistor R24 = 2 MΩ |
| Resistor R25 = 680 kΩ | Resistor R26 = 2 MΩ |
| Resistor R27 = 100 kΩ | |
| Potentiometer P1 = 20 kΩ | Potentiometer P2 = 50 kΩ |
| Potentiometer P3 = 20 kΩ | Potentiometer P4 = 50 kΩ |
| Potentiometer P5 = 20 kΩ in parallel with a 100Ω resistor (not shown) | Potentiometer P6 = 20 kΩ in parallel with a 100Ω resistor (not shown) |
| Potentiometer P7 = 20 kΩ in parallel with a 100Ω resistor (not shown) | Potentiometer P8 = 20 kΩ in parallel with a 100Ω resistor (not shown) |

Resistor tolerances are preferably 1% or better. The system also includes operational amplifier Op10 which is a type 741, and diodes D1, D2, D3, and D4 which are of type 1N485B. As explained further below, the potentiometers $P_1$–$P_8$ are used to match different circuits g to each other.

The circuit details of the circuit f of FIG. 3 are depicted in the circuit diagram of FIG. 5, having the following particular elements:

| | |
|---|---|
| Resistor R28 = 10 kΩ | Resistor R29 = 10 kΩ |
| Resistor R30 = 490 kΩ | Resistor R31 = 490 kΩ |
| Resistor R32 = 50 kΩ | Resistor R33 = 50 kΩ |
| Resistor R34 = 20 kΩ | Resistor R35 = 100 kΩ |
| Resistor R36 = 100 kΩ | Resistor R37 = 100 kΩ. |

Resistor tolerances are preferably 1% or better. The system also includes operational amplifiers Op11 and Op12 which are of type 741, and diodes D5, and D6 which are of type 1N485B.

The circuit shown in FIGS. 3–5 is modeled by the following equations:

$$dx/dt = \beta[y-z] \qquad (8)$$

$$dy/dt = \beta[-\Gamma_y \cdot y - g(x) + \alpha \cdot \cos(\omega_f \cdot t)] \qquad (9)$$

$$dz/dt = \beta[f(x) - \Gamma_z \cdot z] \qquad (10)$$

$$g(x) = -3.8 + 0.5*(|x+2.6| + |x-2.6| + |x+1.2| + |x-1.2|) \qquad (11)$$

$$f(x) = 0.5*x + |x-1| + |x+1|, \qquad (12)$$

where $\alpha = 2.0$, $\Gamma_y = 0.2$, $\Gamma_z = 0.1$, the time factor $\beta = 10^4$/sec, and the angular frequency $\omega_f = 2\pi f_f$, where the transmitter forcing frequency $f_f = 769$ Hz. The cosine term in Equation (9) is provided by a signal $S_1$ supplied by an HP 3300A function generator 115. The functions g(x) (equation (11)) and f(x) (equation (12)) are piecewise linear functions produced by the circuits shown in FIGS. 4 and 5, respectively. Equations (8–9) model the B subsystem (FIG. 3) of the transmitter 110, and equation (10) models the A subsystem (FIG. 3) of the transmitter 110.

This circuit is designed so that it is possible to create a synchronizing subsystem. Equations (8–9) (with z treated as a parameter) constitute the well known 1-well Duffing equations. For the parameter settings used here, the behavior of such a subsystem is periodic, indicating that the largest Lyapunov exponent for this subsystem is zero. Equation (10) was added to the Duffing system of Equations (9–10) to provide an instability for certain values of x, thereby leading to chaos. If the feedback loop between equations (8) and (10) were not completed, i.e. if the subsystem of equations (8–9) were not dependent on the z-variable produced by the subsystem of equation (10), or if the subsystem of equation (10) were not dependent on the x-variable produced by the subsystem of equations (8–9), then the system of variables x, y and z would be periodic. In other words variables x, y and z would each be periodic or a fixed point. The largest conditional Lyapunov exponent with respect to the signal $S_1$ would be less than or equal to zero. The feedback loop between equations (8) and (10) can be disconnected by cutting the system at node $T_1$ and grounding the input (x) to the circuit f, or by cutting the system at node $T_2$. Such disconnection would remove the dependence of equation (10) on the variable x, or the dependence of equation (8) on the variable z, respectively.

The conditional Lyapunov exponents for the transmitter system of FIGS. 3–5 calculated from equations (8–12) with the above parameters are 284 $s^{-1}$, −1433 $s^{-1}$ and −1854 $s^{-1}$. The sinusoidal forcing term $\cos(\omega_r t)$ of equation (9) is treated as a parameter in this calculation, so the zero exponent attributable to signal $S_1$ does not show up here. Since one of the conditional Lyapunov exponents is positive, therefore the system modeled by equations (8–12) and shown in FIGS. 3–5 operates in the chaotic regime.

Referring back to FIG. 1, the transmitter 110 transmits communications signal $S_B$ to a cascaded receiver 120. This transmission is accomplished by means known to persons of ordinary skill in the art, such as over an electrical wire or cable, optical fiber, or by electromagnetic radiation.

The receiver 120 is responsive to the signal $S_B$ and to a receiver forcing signal $S_2$ for producing a receiver output signal $S_{B''}$ which is to be synchronized with the signal $S_B$. The receiver 120 can be at a remote location with respect to the transmitter 110. The receiver 120 includes two subsystems A' and B" which are cascade connected, as described further below, and which are duplicates of subsystems A and B, respectively, of the transmitter 110. The potentiometers P1–P8 of circuit g shown in FIG. 4 are used to match the circuit g in subsystems B and B" (FIG. 1) to compensate for variations in other device characteristics, such as diodes D1–D4. Typically, the potentiometers P1–P8 are adjusted so that corresponding diodes cut in and cut out at the same potential drops.

The subsystem A' is responsive to the communications signal $S_B$ produced by the transmitter 110 and provides a response signal $S_{A'}$ to the subsystem B". The subsystem B" in turn is responsive to signal $S_{A'}$ and to a periodic receiver forcing signal $S_2$ for producing signal $S_{B''}$. The subsystems A' and B" are cascade connected in that the subsystem A' drives the subsystem B" and the subsystem B" does not directly drive the subsystem A'.

Figure 6:
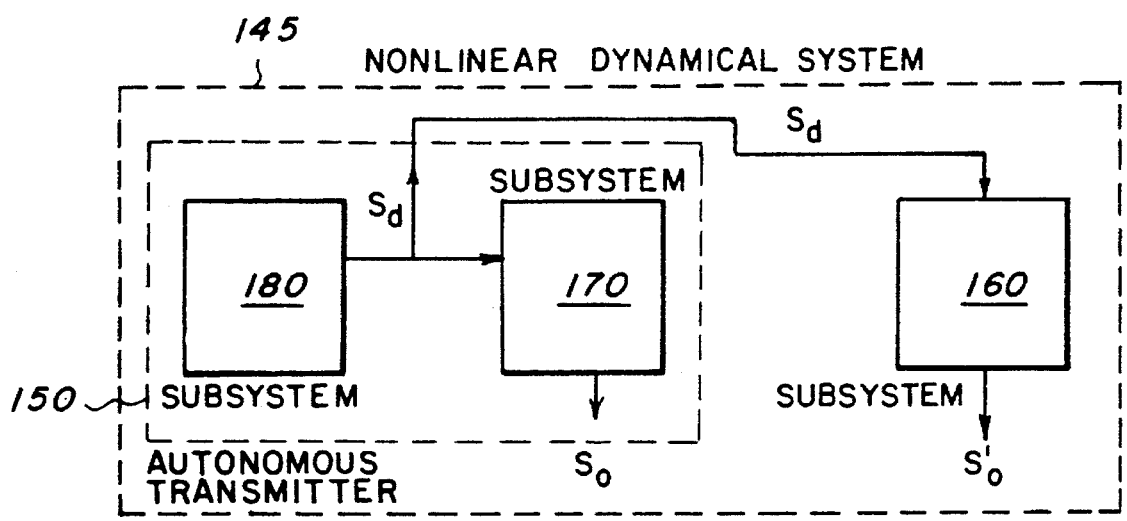
FIG. 6 is a general block diagram of a nonlinear dynamical system according to prior art.

Referring now to FIG. 6, a related system 145 according to U.S. Pat. No. 5,245,660 is shown. System 145 is an autonomous nonlinear dynamical transmitter 150 driving a duplicate 160 of a stable nonlinear dynamical subsystem 170 of the transmitter 150 with a signal $S_d$. The signal $S_d$ is produced by a subsystem 180 of the transmitter 150. Signal $S_d$ also drives the subsystem 170 of the transmitter 150. Although not shown, subsystems 170 and 180 can be interdependent, i.e. subsystem 170 can also drive subsystem 180. Using the terms defined earlier, the subsystem 170 and the duplicate system 160 are each stable with respect to the signal $S_d$ that drives them. In most physical systems, the subsystem 170 and the duplicate 160 are not identical because the components, such as resistors, have slightly different physical characteristics, and because the systems 170 and 160 start off with slightly different initial conditions. Nevertheless, if the systems 170 and 160 started off in the same basin of attraction, and if the corresponding parameters for the systems 170 and 160 are nearly the same, then the signals $S_o$ and $S_{o'}$ produced by the transmitter 150 and the duplicate system 170, respectively, would be in synchronization, even if the signals $S_o$ and $S_{o'}$ are chaotic. Synchronization of such systems is discussed further in U.S. Pat. No. 5,245,600, col. 5, lines 17–51; U.S. patent application No. 08/129,495, page 14, line 3—page 15, line 15; Pecora et ano., "Synchronization in Chaotic Systems", Phys. Rev. Let., Vol. 64, No. 8, Feb. 19, 1990, pp. 821–824; and Carroll et ano., "Synchronizing Chaotic Systems" SPIE vol. 2038 Chaos in Communications (1993), pp. 32–41, which articles are incorporated herein by reference.

Referring back to FIGS. 1 and 3–5 for the example discussed earlier, subsystems A and B of the transmitter are duplicated as subsystems A' and B" of the receiver 120, modeled by the following equations:

$$dx''/dt = \beta[y'' - z'] \tag{13}$$

$$dy''/dt = \beta[-\Gamma_y \cdot y'' - g(x'') + \alpha \cdot \cos(\omega_r \cdot t + \phi_r)] \tag{14}$$

$$dz'/dt = \beta[f(x) - \Gamma_z \cdot z'], \tag{15}$$

where the functions g and f are modeled by equations (11–12), respectively, the parameters $\alpha$, $\Gamma_y$, $\Gamma_z$, and $\beta$ have the same values as specified above for equations (8–12), and both $\phi_r$, the phase constant for the cosine term in the receiver (equation 14) and $\omega_r$, the angular frequency of the forcing signal $S_2$ for the receiver, are adjustable. The cosine term in Equation (14) is provided by the receiver forcing signal S2. Equation (15) models the A' subsystem, and equations (13–14) model the B" subsystem. In particular, the x variable models the $S_B$ signal produced by the transmitter 110 (equation 8), the A' subsystem, responsive to the $S_B$ signal, produces the signal $S_{A'}$ modeled by variable z', and the B" subsystem, responsive to the $S_{A'}$ signal, produces the signal $S_{B''}$ modeled by variable x".

If the receiver forcing signal $S_2$ were of the same frequency and in phase with the periodic transmitter forcing signal $S_1$, i.e. if $\omega_r = \omega_t$ and $\phi_r = \phi_t = \Phi$, a constant offset value, and if the transmitter 110 and receiver 120 started in the same basin of attraction, then the communications signal $S_B$ produced by the transmitter 110 and the receiver output signal $S_{B''}$ would become synchronized after a period of time, i.e., they would converge toward the same value. However, the periodic transmitter forcing signal $S_1$ and periodic receiver forcing signal $S_2$ can be generated independently and at remote locations, and do not necessarily have the same frequency and phase.

As used herein, two signals are considered in synchronization with respect to each other if their difference (adjusted by a fixed time shift) approaches a small, bound value. In practice, the actual devices in physical systems 110 and 120 may have slightly different characteristics. As shown in Pecora and Carroll, "Driving Systems With Chaotic Signals" (Phys. Rev. A, Vol. 44, No. 4, 15 Aug. 1991, pp. 2379–2383), which article is incorporated herein by reference, if the differences in physical characteristics are not large, similar systems can still produce synchronized signals as defined above.

Since the transmitter 110 is a nonlinear system, the communications signal $S_B$ contains enough phase information about the transmitter forcing signal $S_1$, and the receiver contains enough phase information about the receiver forcing signal $S_2$ that the receiver forcing signal $S_2$ can be adjusted to bring it to the same frequency and phase (or phase-offset by a constant amount) as the transmitter forcing signal $S_1$, and so that the receiver output signal $S_{B''}$ can be in synchronization with the communications signal $S_B$. A phase-detector/controller 130, such as is used in phase locked circuits, is responsive to the communications signal $S_B$ and to the receiver output signal $S_{B''}$ for producing a correction signal $S_{corr}$ responsive to the phase difference between the transmitter forcing signal $S_1$ and the receiver forcing signal $S_2$. Optionally, a phase comparator 182 responsive to the receiver forcing signal $S_2$ and to a periodic reference signal $S_{ref}$ produced by an oscillator 184 produces a comparison signal $S_{comp}$.

Figure 7:
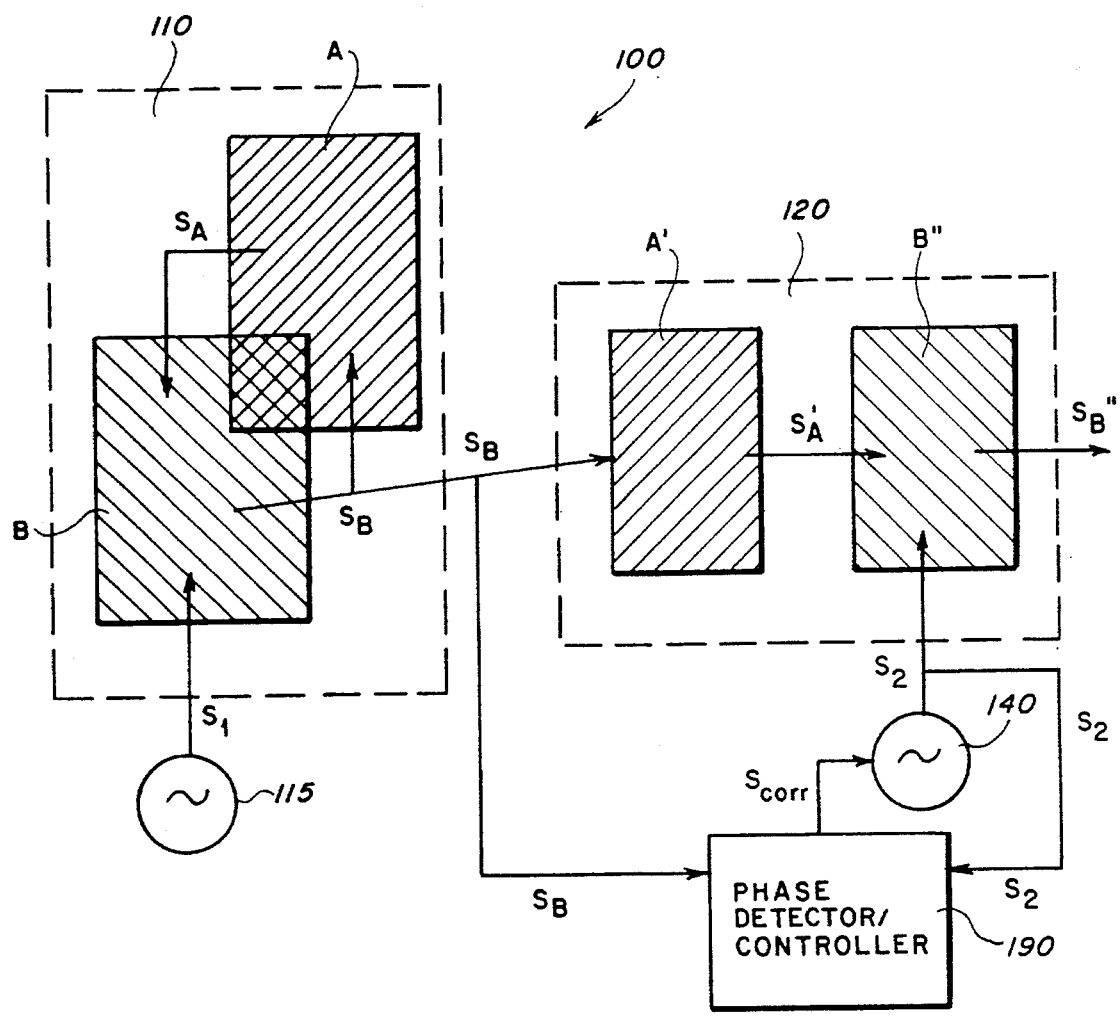
FIG. 7 is a general block diagram of a two-stage cascaded non-autonomous synchronized system.

Referring now to FIG. 7, an alternative configuration is shown in which a phase-detector/controller 190 is responsive to the communications signal $S_B$ and to the receiver forcing signal $S_2$ for producing a correction signal $S_{corr}$ responsive to the phase difference between the transmitter forcing signal $S_1$ and the receiver forcing signal $S_2$. The phase-detector/controllers 130 and 190 of FIGS. 1 and 7, respectively, are each coupled to the receiver 120 and can be located remote with respect to the transmitter 110.

Referring back to FIGS. 1 and 7, a signal generator 140, such as a voltage controlled oscillator or tracking oscillator used in phase locked circuits, is responsive to the correction signal $S_{corr}$ and optionally, the comparison signal $S_{comp}$ for producing the receiver forcing signal $S_2$. The subsystem 140 uses the comparison signal $S_{comp}$ to correct the phase of the receiver forcing signal $S_2$, for example, by delaying the forcing signal $S_2$, so that it matches the transmitter forcing signal $S_1$. For example, the signal generator 140 can operate by varying the phase of the receiver forcing signal $S_2$ directly in response to the correction signal $S_{corr}$, or by varying the phase indirectly by modulating the frequency. Over a period of time, the receiver forcing signal $S_2$ produced by the signal generator 140 becomes in phase with and at the same frequency as the transmitter forcing signal $S_1$, as the receiver output signal $S_{B''}$ approaches the communications signal $S_B$ and thereby becomes synchronized with it.

Each subsystem A' and B" in the receiver 120 is driven by one or more signals which supply information in the complete system 110 which is lacking in the driven subsystem. Thus, subsystem A' in the receiver 120 is driven by the same signal $S_B$ that drives subsystem A in the transmitter 110. Subsystem B" in the receiver 120 is driven by signal $S_{A'}$ produced by subsystem A' and by the forcing signal $S_2$, just as subsystem B in the transmitter 110 is driven by signal $S_A$ produced by subsystem A and by the forcing signal $S_1$.

For any two dynamical systems to become synchronized, they must start in the same basin of attraction. That is, their starting points (initial conditions) must be in the same set of points which will converge to the same attractor. The system shown in FIGS. 3–5 has one attractor and one basin of attraction. However, many other dynamical systems have more than one attractor, and it is possible for two such systems to start in different basins.

As discussed earlier, in general, either subsystem A or subsystem B or both subsystem A and subsystem B of the transmitter 110 can be forced. The corresponding part of the receiver 120, be it subsystem A' or subsystem B" or both, is forced by an appropriate receiver forcing signal (not shown) produced by an associated signal generator (not shown) and adjusted responsive to an associated comparison signal (not shown) produced as described above. For example, if subsystem A of the transmitter 110 were forced by transmitter forcing signal $S_1$, then subsystem A' of the receiver 120 would be forced by receiver forcing signal $S_2$. The phase-detector/controller 140 of FIG. 1 could be responsive to signals $S_B$ and $S_{B''}$, and the phase-detector/controller 190 of FIG. 7 could be responsive to forcing signals $S_1$ and $S_2$.

Figure 8:
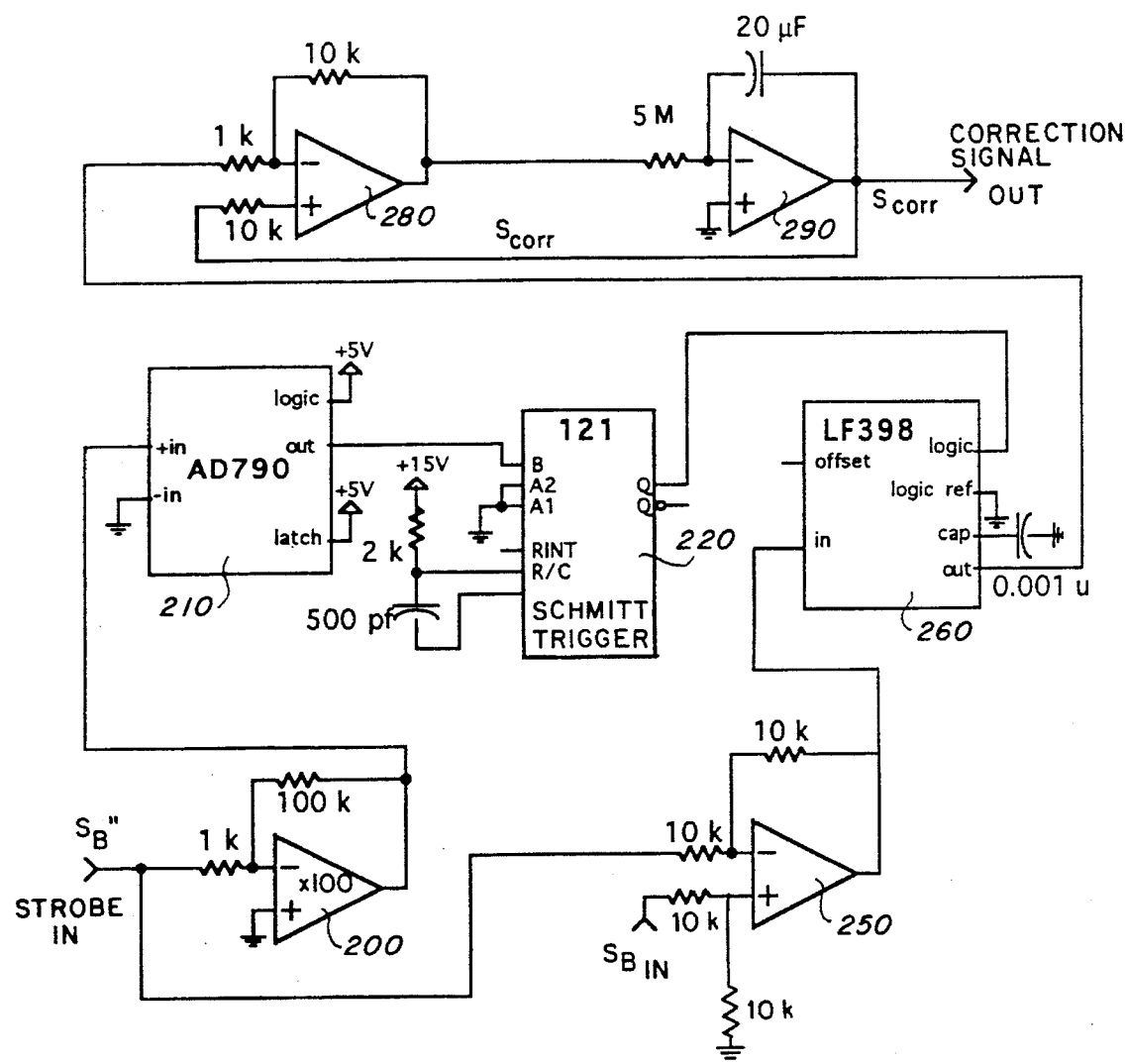
FIG. 8 depicts the circuit details of a phase-detector/controller of FIG. 1.

Referring now to FIG. 8, the details of a phase-detector/controller 130 of FIG. 1 is shown. This phase-detector/controller 130 is responsive to the communications signal $S_B$ and to the receiver output signal $S_{B''}$ for producing a correction signal $S_{corr}$ responsive to the phase difference between the transmitter forcing signal $S_1$ and the receiver forcing signal $S_2$. The same system shown in FIG. 8 may be used as a phase-detector/controller 190 of FIG. 7 except that the strobe input signal $S_2$ is substituted for the strobe input signal $S_{B''}$.

The strobe input signal $S_{B''}$ generated by the receiver 120 is applied to an amplifier 200 with a high gain such as a 741 type amplifier with a gain of −100. The output of the amplifier 200 is applied to a conventional comparator 210, such as an AD 790. The comparator 210 produces an output when the input signal $S_{B''}$ is less than zero. The positive-going signal from the comparator 210 triggers a conventional Schmitt trigger circuit 220, such as an SN 74121 monostable multi-vibrator. As a result, the Schmitt trigger circuit 220 produces a pulse of about 1 microsecond (μs) duration when the strobe input signal $S_{B''}$ crosses 0 in the negative direction. A difference device 250, such as a 741 operational amplifier, generates the difference signal $S_B - S_{B''}$ between the communication signal $S_B$ and the strobe signal $S_{B''}$. The difference signal $S_B - S_{B''}$ produced by the difference device 250 is applied to the signal input of a conventional sample and hold circuit 260, such as an L 398, and the output of the Schmitt trigger circuit 220 is applied to the logic input of the sample and hold circuit 260. In other words, the difference $S_B - S_{B''}$ between the communication signal $S_B$ and the strobe signal $S_{B''}$ is applied to the sample and hold circuit 260, which holds the difference seen when the strobe signal $S_{B''}$ passes through 0 going negative.

The sampled signal produced by the sample and hold circuit 260 is applied to the negative terminal of a 741 type amplifier 280, and the correction signal $S_{corr}$ is applied to the positive terminal of the amplifier 280 thereby providing negative feedback. The amplifier 280 thus accumulates the sampled difference signal and the correction signal $S_{corr}$. The correction signal $S_{corr}$ is produced by a conventional integrator 290, having a long time constant preferably of about 10 seconds (s), such as type 741 amplifier with a mica capacitor used for feedback, that averages the output of the amplifier 280. In other words, the output of the sample and hold circuit 260 is applied to an integrator to produce a correction signal $S_{corr}$ proportional to the average phase difference transmitter forcing signal $S_1$ and receiver forcing signal $S_2$.

Referring back to FIG. 1, a signal generator 140 responsive to the correction signal $S_{corr}$ produced by the phase-detector/controller 130 of FIG. 8 which is itself responsive to a communications signal $S_B$ produced by the circuit shown in FIGS. 3–5 preferably utilizes an HP 8116A function generator (not shown). Such a signal generator 140 multiplies the correction signal $S_{corr}$ produced by the phase-detector/controller 130 of FIG. 8 by a factor of 1/100 and uses the resulting signal to modulate the frequency of the HP8116A function generator.

Figure 9:
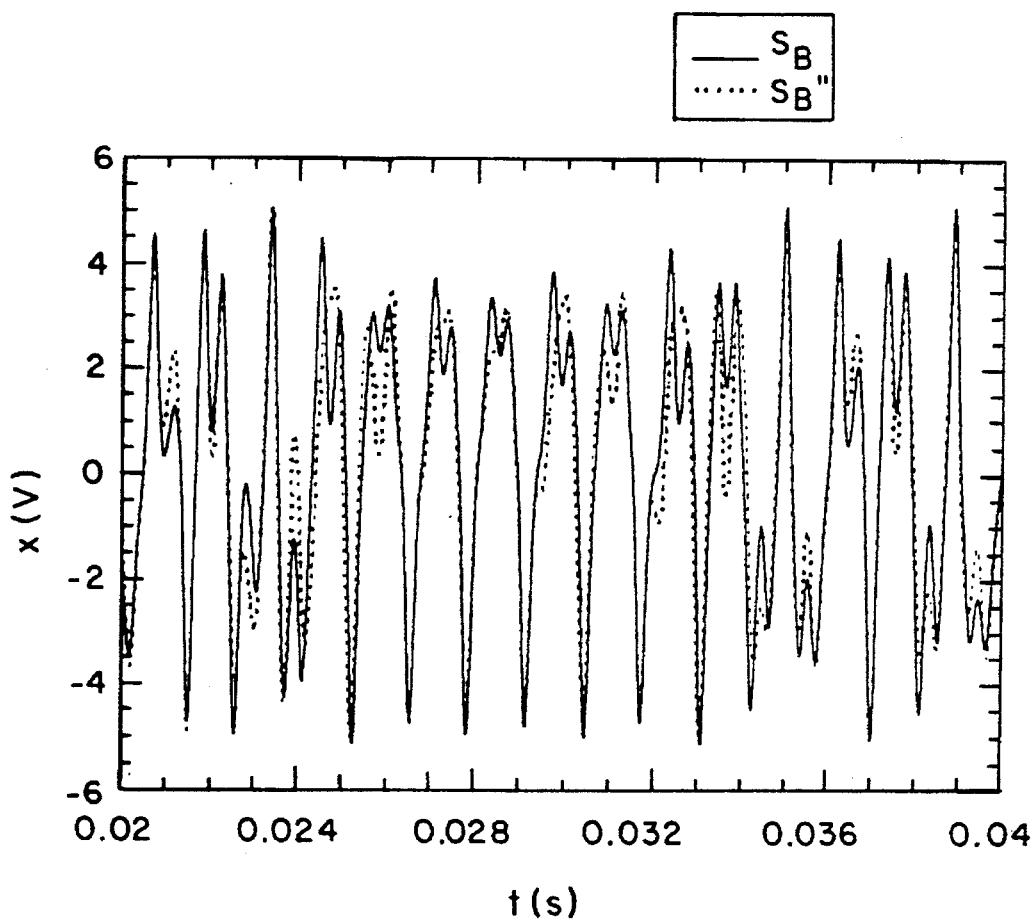
FIG. 9 is a time plot of signals $S_B$ and $S_{B''}$ according to the system of FIGS. 1, 3–5 and 8.

Referring now to FIG. 9, time plots of the communication signal $S_B$ and the receiver output signal $S_{B''}$ are shown for the above-described system of FIGS. 1, 3–5, and 8. Although signals $S_B$ and $S_{B''}$ evolve chaotically, they are in synchronization.

Figure 10:
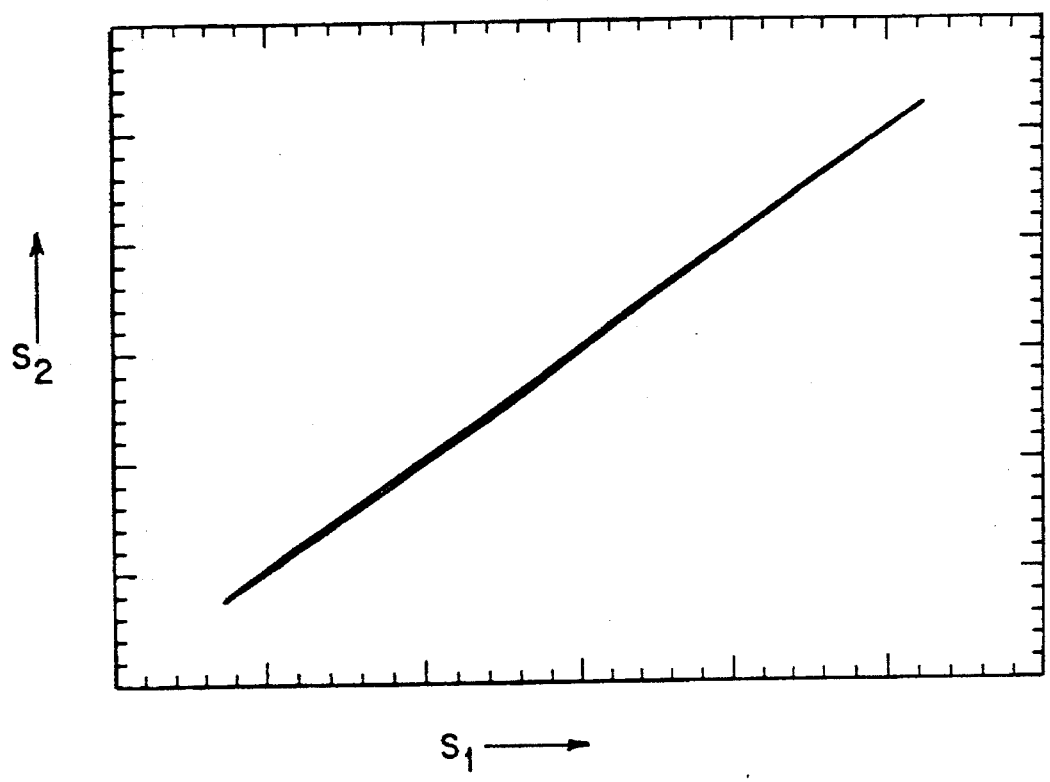
FIG. 10 is a plot of forcing signals S1 and S2 according to the system of FIGS. 1, 3–5 and 8.

Referring now to FIG. 10, forcing signals $S_1$ and $S_2$ of the transmitter 110 and receiver 120, respectively, are plotted against each other, using time as a parameter, for the above-described system of FIGS. 1, 3–5, and 8. The forcing signal $S_2$ of the receiver 120 has been successfully synchronized with the forcing signal $S_1$ of the transmitter 110 by driving the receiver 120 with the chaotic communications signal $S_B$. The capture range of the receiver 120 is approximately 2 Hertz (Hz).

Figure 11A:
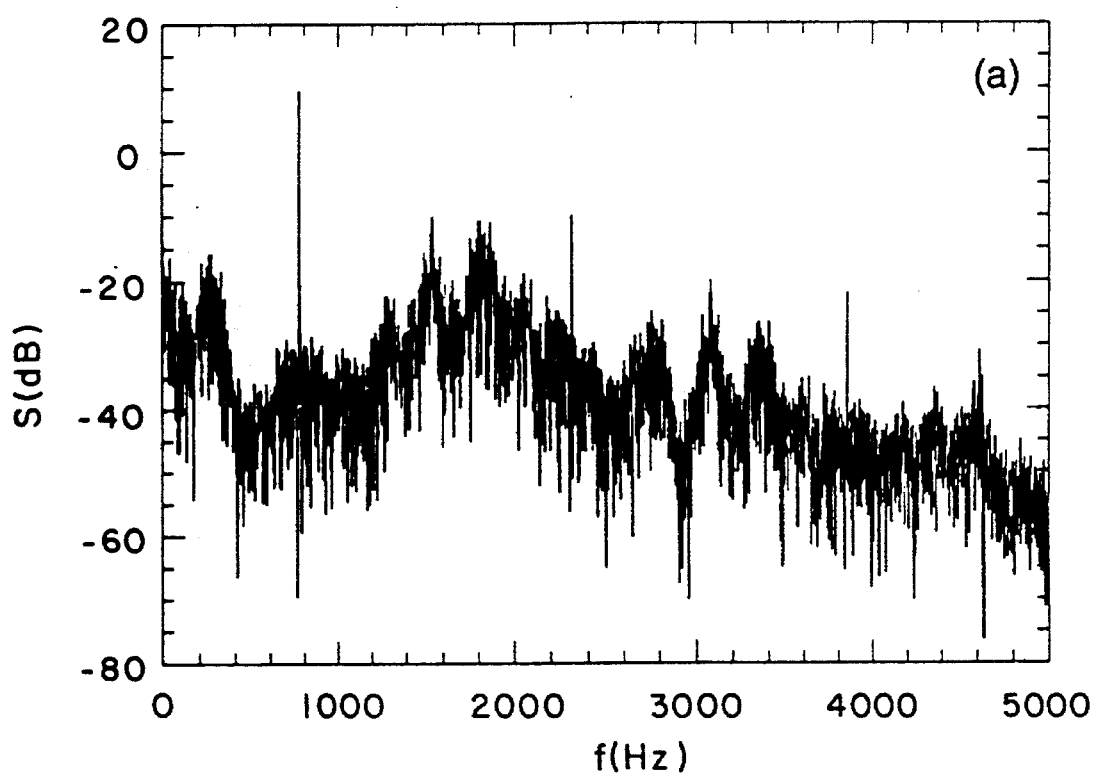
FIG. 11(a) is a power spectrum plot of the driving signal $S_B$ for the system of FIGS. 1, 3–5 and 8.
Figure 11B:
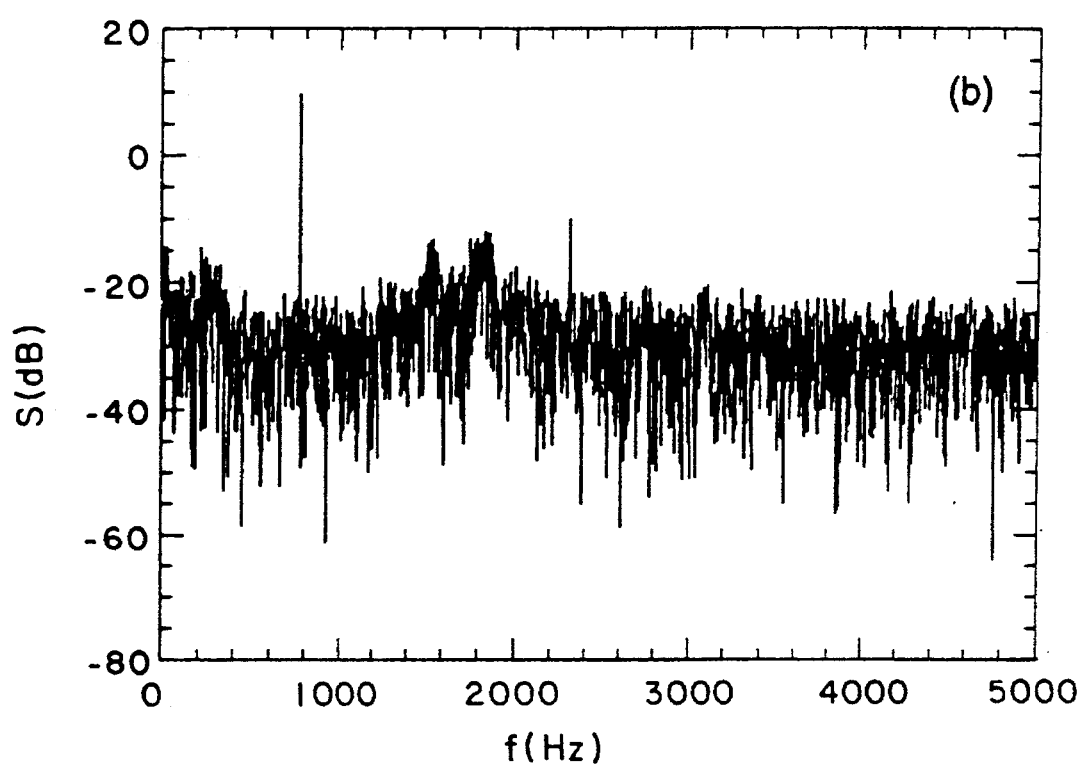
FIG. 11(b) is a power spectrum plot of the driving signal $S_B$ for the system of FIGS. 1, 3–5 and 8 with noise added.
Figure 11C:
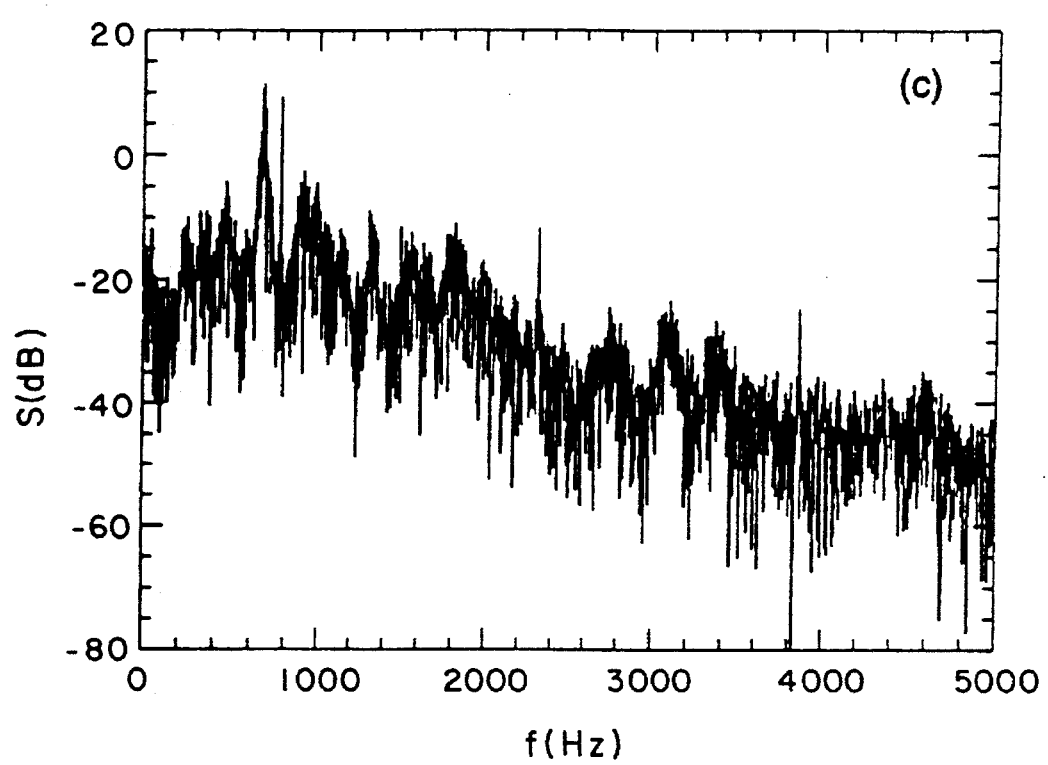
FIG. 11(c) is a power spectrum plot of the driving signal $S_B$ for the system of FIGS. 1, 3–5 and 8 with chaos added.
Figure 12A:
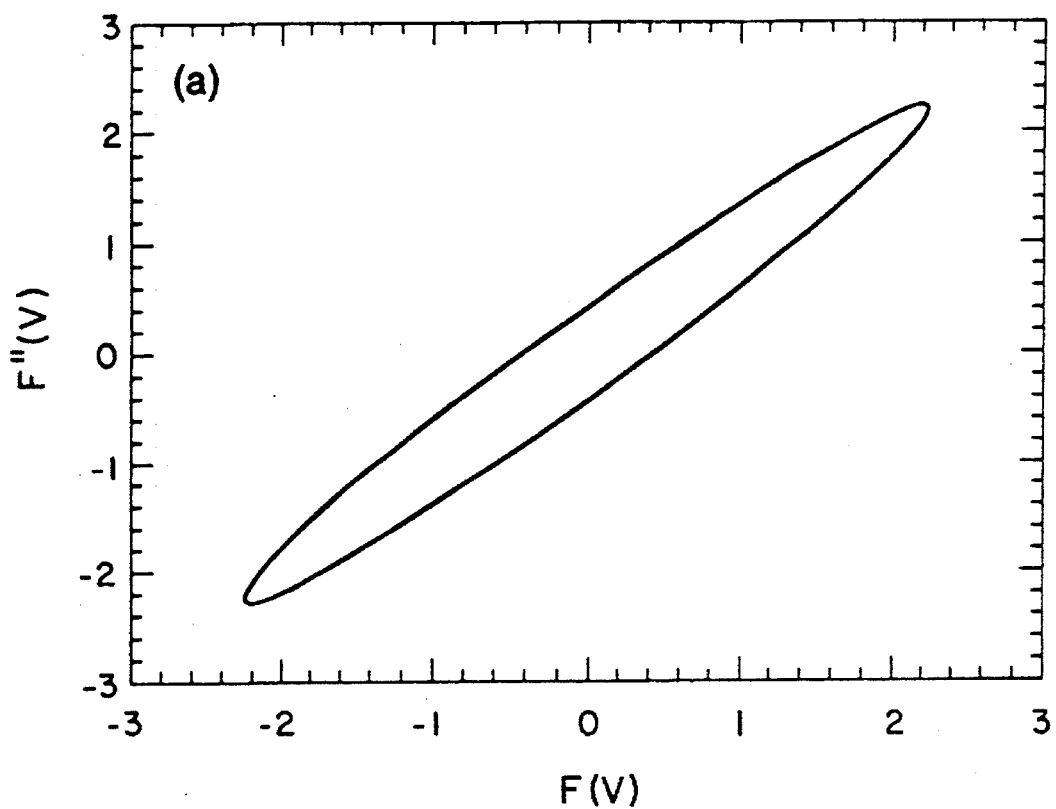
FIG. 12(a) is a plot of the forcing signals $S_1$ and $S_2$ for the system of FIGS. 1, 3–5 and 8 with noise added.
Figure 12B:
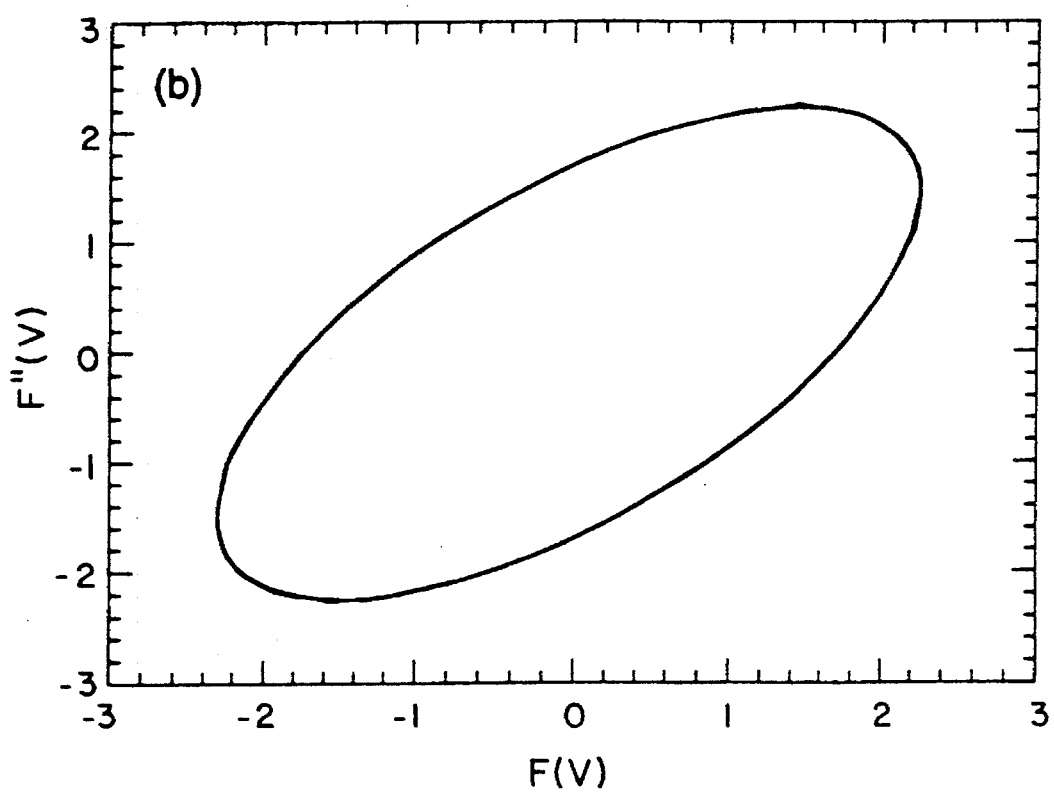
FIG. 12(b) is a plot of the forcing signals $S_1$ and $S_2$ for the system of FIGS. 1, 3–5 and 8 with chaos added.

For the system shown in FIGS. 1, 3–5, and 8, the synchronization of the response to the drive is fairly insensitive to noise or chaos added to the drive signal. FIGS. 11(a), (b) and (c) are power spectrum plots of the driving signal $S_B$ for the system of FIGS. 1, 3–5 and 8 without modification and as modified by noise and chaos, respectively. In FIG. 11(b), white noise from a General Radio 1390-B random noise generator was added to the drive signal $S_B$. In FIG. 11(c), a large chaotic signal from another chaotic circuit was added to the drive signal $S_B$. In particular, the $x_2$ signal from the system described in U.S. application Ser. No. 08/129,495, FIG. 12, with R12=47 kΩ was added to drive signal $S_B$. FIGS. 12(a) and (b) show the transmitter forcing signal $S_1$ plotted against the receiver forcing signal $S_2$ for the systems of FIGS. 11(b) and (c), respectively. As seen in FIGS. 12(a) and (b), the transmitter forcing signal $S_1$ and the receiver forcing signal $S_2$ have constant offset phase difference, but are still synchronized.

Figure 13:
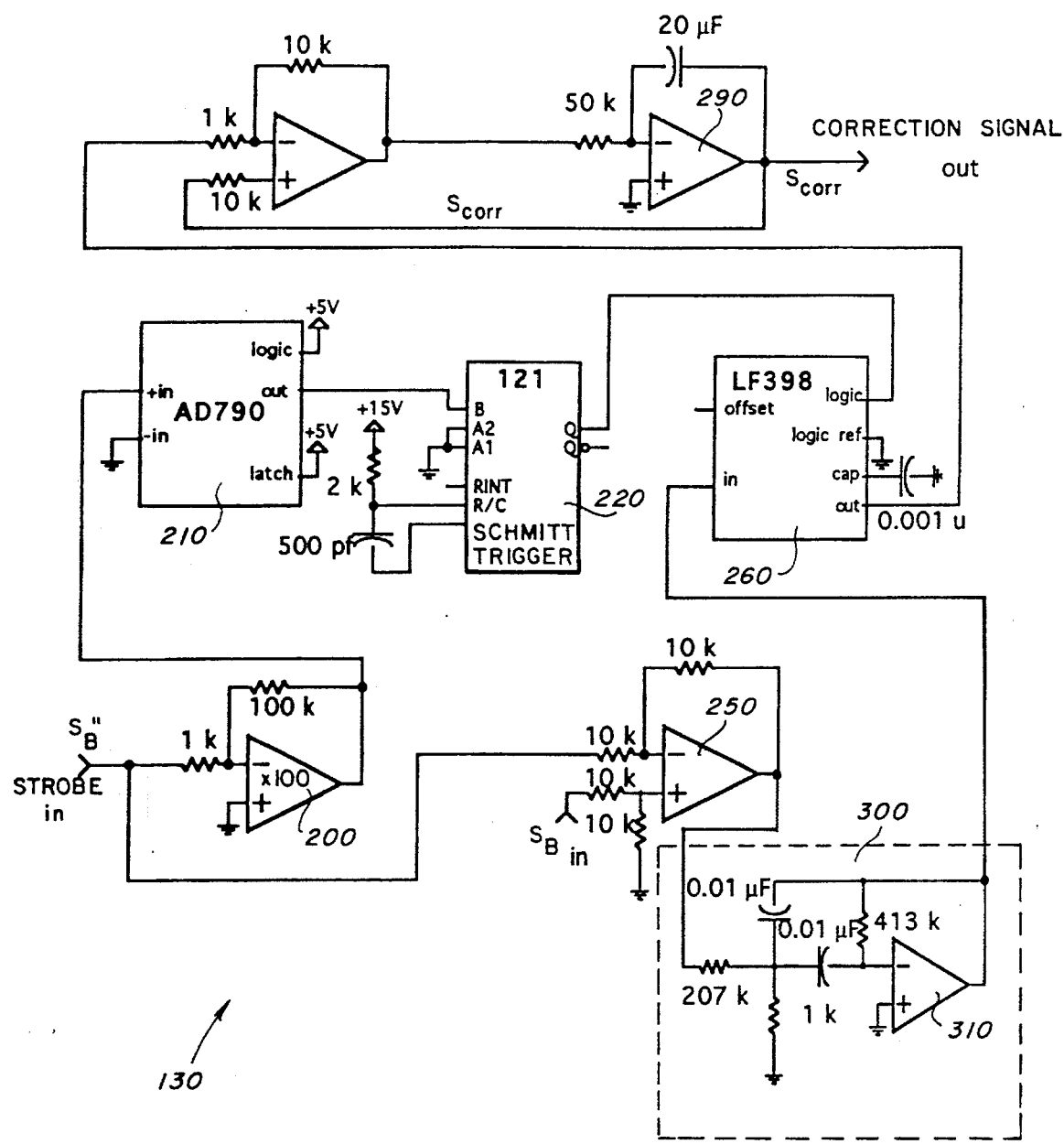
FIG. 13 depicts the circuit details of a phase-detector/controller of FIG. 1 which includes a second order band-pass filter.

Referring now to FIG. 13, another phase-detector/controller 130 is shown. The difference signal produced by the difference device 250 is not applied directly to the sample and hold circuit 260. Rather, the difference signal is applied to a second order bandpass filter 300 which uses a type 741 operational amplifier 310. The bandpass filter 300 preferably has center frequency of 769 kHz and a Q-factor of at least 20. The bandwidth of the bandpass filter 300 is preferably as narrow as possible, i.e. Q is preferably as high as possible, so long as filter 300 is readily tunable.

The output of the bandpass filter 300 is applied to the input of the sample and hold circuit 260. The time constant of the integrator 290 is reduced to 0.1 s, improving the response time of the phase-detector/controller 130 by up to a factor of 100 over the phase-detector/controller 130 of FIG. 10.

The theoretical discussion of the system 100 of FIGS. 1 and 3–5 using the phase-detector/controller 130 of FIG. 13 is as follows: consider two periodically forced systems having state variables $x_1$ and $v_1$, and $x_2$ and $v_2$, respectively, such as the Duffing system modeled by the following equations:

$$dx_1/dt = v_1 \quad (16)$$

$$dv_1/dt = -\gamma \cdot v_1 + g(x_1) + A \cdot \cos(\phi_1) \quad (17)$$

$$d\phi_1/dt = \omega \quad (18)$$

$$dx_2/dt = v_2 \quad (19)$$

$$dv_2/dt = -\gamma \cdot v_2 + g(x_2) + A \cdot \cos(\phi_2) \quad (20)$$

$$d\phi_2/dt = \omega, \quad (21)$$

where $\gamma$ and A are constants and the circuit g is modeled by equation (11). Suppose the $x_1$ component of the first system drives the second system as modeled by:

$$dv_2/dt = -\gamma \cdot v_2 + g(x_1) + A \cdot \cos(\phi_2). \quad (22)$$

In order to synchronize the two systems, it is desirable to have the phase difference $\delta\phi \equiv \phi_2 - \phi_1$ approach 0. For $\delta x \equiv x_2 - x_1$ and $\delta\phi(0) \equiv \phi_2(0) - \phi_1(0)$, the latter at time t=0, and for small $\delta\phi(0)$, it follows from equations (17) and (22) that after an initial transient time, $$\delta x = \frac{A \cdot \delta\phi(0)}{\omega \cdot (\gamma^2 + \omega^2)} [\gamma \cdot \cos(\omega t + \phi_1(0)) + \omega \cdot \sin(\omega t + \phi_1(0))] + C_{DC}, \quad (23)$$

where $C_{DC}$ is a time invariant constant.

Therefore, the amplitude of the AC (time-varying) component of $\delta x$ is proportional to the phase difference between the two systems and is modulated at the forcing frequency $\omega$. The phase-detector/controller 130 of FIG. 13 extracts the phase difference $\delta\phi$ by filtering $\delta x$ at the forcing frequency $\omega$ and measuring the amplitude of the filter output.

There are many other ways in which the phase of the response system forcing signal $S_2$ can be corrected. Any of the signals in the response system 120 can be used as a strobe, taking into account that the value of the error signal for zero phase difference will be offset by some constant for strobe signals other than $S_{B''}$. Alternatively, the product of the response system forcing signal $S_2$ and the driving signal $S_B$ can be taken and then averaged over a long period of time. This long time average will be at a maximum when the response system 120 is in phase with the driving system 110. An error correction signal may be generated as follows: the frequency of the response system forcing signal $S_2$ is modulated by a signal of much lower frequency than the frequency of the response system forcing signal $S_2$. The long time average product signal will then contain a modulation at the same low modulation frequency. Filtering out this modulation frequency and taking its average will yield a DC signal that is positive, negative or zero, depending on the phase difference between the drive and response systems 120 and 110, respectively. This product technique would also be useful when noise was added to the drive signal $S_B$. In this case, the actual amplitude of the drive signal $S_B$ might be unknown. When the drive and response systems 120 and 110, respectively are in phase, the long term average of the product function should have a certain value. If the noise averages to zero, it will not change this value. Therefore, the amplitude of the noise plus the drive signal $S_B$ may be adjusted until the long term average has the desired value amplitude.

The same principles discussed above concerning cascaded systems with 2 stable non-overlapping subsystems, at least one of which is forced, apply equally well to cascaded systems with more than 2 stable non-overlapping subsystems, at least one of which is forced. In particular, each of the cascaded subsystems in the receiver is a duplicate of a stable subsystem in the transmitter. Each subsystem in the receiver is driven by a signal which supplies information from the complete system that is lacking in the driven subsystem, in particular, by a signal corresponding to the signal which drives the corresponding subsystem in the transmitter and by a periodic forcing signal if the corresponding subsystem in the transmitter is forced.

Figure 14:
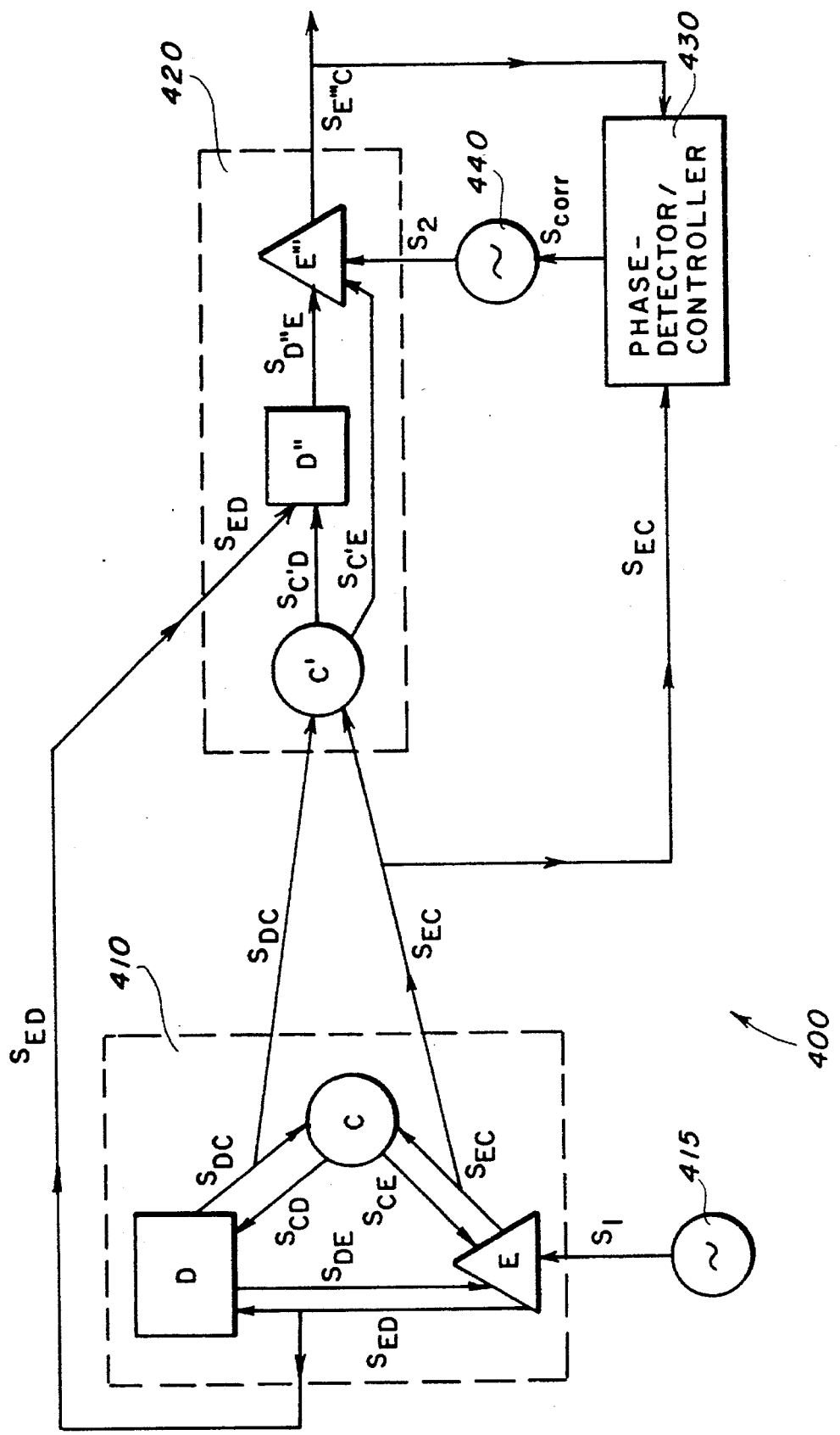
FIG. 14 is a general block diagram of a three-stage cascaded non-autonomous synchronized system.

Turning now to FIG. 14, an example of a cascaded synchronized system 400 with 3 subsystems is shown. In this arrangement the transmitter 410 is broken up into 3 interdependent subsystems C, D and E. As with the system of FIGS. 1 and 7, the transmitter 410 is a nonlinear nonautonomous system driven by a transmitter forcing signal $S_1$ for producing communications signal $S_{EC}$. The transmitter forcing signal $S_1$ is produced by a signal generator 415 and is periodic. Transmitter 410 evolves chaotically, that is, it has at least one positive conditional Lyapunov exponent when driven by the transmitter forcing signal $S_1$. The communications signal $S_{EC}$ is called "chaotic" since it is produced by a system 410 that evolves chaotically.

The transmitter 410 includes 3 interdependent subsystems C, D and E which may or may not overlap in part but which together constitute all essential aspects of the nonlinear system 410. Subsystems C, D and E are non-overlapping in the sense that at least part of subsystem C is external to both subsystems D and E, at least part of subsystem D is external to both subsystems C and E, and at least part of subsystem E is external to both subsystems C and D. For the sake of completeness, every subsystem is shown as driving every other subsystem, but this mutual interdependence is not absolutely necessary for the practice of this invention. Subsystem C drives subsystems D and E with signals $S_{CD}$ and $S_{CE}$, respectively, subsystem D drives subsystems E and F with signals $S_{DE}$ and $S_{DC}$, respectively, and subsystem E drives subsystems C and D with signals $S_{EC}$ and $S_{ED}$, respectively. Subsystem B is also forced by the transmitter forcing signal $S_1$. Using the above definition of stable, subsystem C is stable with respect to signals $S_{DC}$ and $S_{EC}$, subsystem D is stable with respect to signals $S_{ED}$ and $S_{CD}$, and subsystem E is stable with respect to signals $S_{CE}$ and $S_{DE}$. I.e., subsystem C has all negative conditional Lyapunov exponents with respect to signal $S_{DC}$ and $S_{EC}$, subsystem D has all negative conditional Lyapunov exponents with respect to signals $S_{EC}$ and $S_{CD}$, and subsystem E has all negative conditional Lyapunov exponents with respect to signals $S_{CE}$ and $S_{DE}$. Signals $S_{CD}$, $S_{CE}$, $S_{DE}$, $S_{DC}$, $S_{EC}$ and $S_{ED}$ each contain phase information about the transmitter forcing signal $S_1$.

The transmitter 410 transmits signals $S_{EC}$, $S_{DC}$, and $S_{ED}$ to a cascaded receiver 420. The receiver 420 is responsive to the signals $S_{EC}$, $S_{DC}$, and $S_{ED}$ and to a receiver forcing signal $S_2$ for producing a receiver output signal $S_{E'''C}$ which is to be synchronized with the communications signal $S_{EC}$.

The first stage of the cascaded receiver 420 is a subsystem C' which is a duplicate of subsystem C in the transmitter 410. The transmitter 410 drives the subsystem C' with signals $S_{EC}$ and $S_{DC}$ which may in fact constitute a single signal (not shown). As so driven, the first stage C' produces a signal $S_{CD}$ which is in synchronization with signal $S_{CD}$ produced by subsystem C in the transmitter 410. The second stage of the cascaded receiver 420 is a subsystem D" which is a duplicate of subsystem D in the transmitter 410. The transmitter 410 and the first stage C' drive the second stage D" with signals $S_{CD}$ and $S_{ED}$, respectively. As so driven, the second stage D" produces signal $S_{D''E}$ which is in synchronization with signal $S_{DE}$ produced in subsystem D of the transmitter 410. The third stage of the cascaded receiver 420 is a subsystem E''' which is a duplicate of subsystem E in the transmitter 410. The second stage D" drives the third stage E''' with signal $S_{D''E}$. In addition, the first stage C' drives the third stage E''' with signal $S_{CE}$. The third stage E''' is responsive to signals $S_{D''E}$ and $S_{D''E}$ and to the receiver forcing signal $S_2$ for producing the receiver output signal $S_{E'''C}$ in synchronization with communications signal $S_{EC}$ of the transmitter 410. The actual configuration of signals driving subsystems in the cascaded receiver 420 depends on the specific system 410 which is duplicated and is readily determined by a person of ordinary skill in the art. Although not shown, the receiver 420 can produce additional signals such as $S_{D''C}$ and $S_{E'''D}$ which are in synchronization with signals $S_{DC}$ and $S_{ED}$ produced by the transmitter 410.

The first, second and third stages C', D" and E''', respectively, of the receiver 420 are cascade connected in that the first stage C' drives the second stage D" but the second stage D" does not directly drive the first stage C', and the second stage D" drives the third stage E''' but the third stage E''' does not directly drive the second stage D".

A phase-detector/controller 430 is responsive to the communications signal $S_{EC}$ and to the receive output signal $S_{E'''C}$ for producing a correction signal $S_{corr}$. An oscillator 440 responsive to the correction signal $S_{corr}$ produces the periodic receiver forcing signal $S_2$ which is eventually in phase (or phase-offset by a constant amount) with the transmitter forcing signal $S_1$ so that the communication signal $S_{EC}$ and the receiver output signal $S_{E'''C}$ are eventually in synchronization.

As with the system 100 of FIG. 1, the design of the synchronizing system 400 of FIG. 14 can be modified in keeping with the scope of the invention. Any 1, 2 or all 3 of the subsystems C, D, or E of the transmitter 410 and corresponding stages C', D" or E''' of the receiver 420 can be forced. Any of the signals $S_{CD}$, $S_{CE}$, $S_{DE}$, $S_{DC}$, $S_{EC}$ and $S_{ED}$ of the transmitter 410 may be used for phase-detection/comparison with any of the signals of the receiver 420. The phase of the receiver forcing signal $S_2$ can be corrected in any of a number of ways. The synchronizing system 400 may have any number of stable non-overlapping subparts so long as the transmitter 410 is nonlinear and has at least 2 subparts. The systems of FIGS. 1 and 14 having 2 and 3 subparts, respectively, are by way of example only.

We will now discuss how the cascaded synchronized systems of FIGS. 1, 7 or 14 can be modified for information transfer or communication. Cascaded synchronization as discussed earlier is quite useful for private communications. One may consider sending a signal from the full system with an information signal "mixed-in", such as by modulation or by parameter variation.

Figure 15:
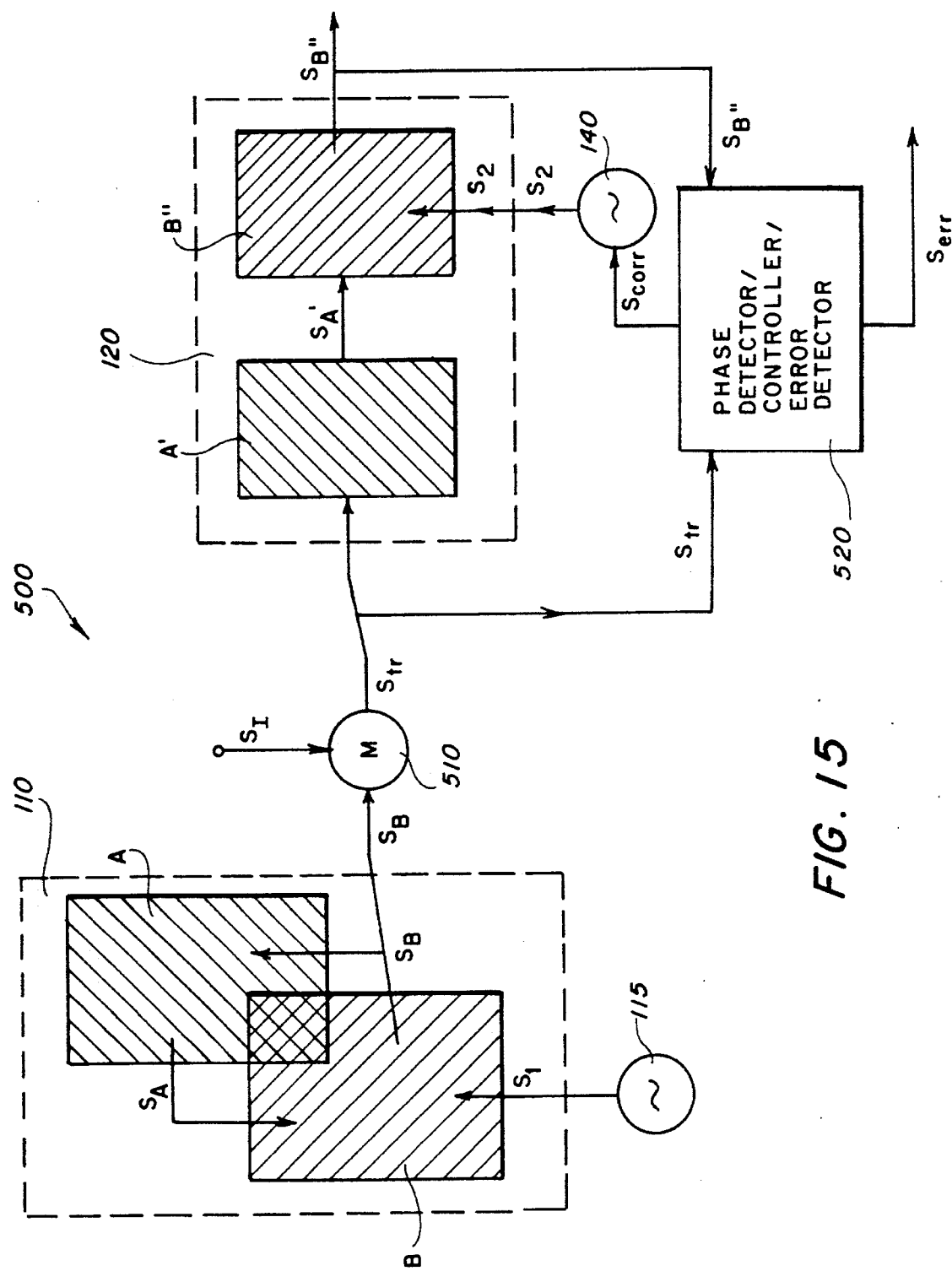
FIG. 15 is a general block diagram of an information transfer system for transferring information contained in an information signal.

Referring now to FIG. 15, a 2-stage cascaded information transfer system 500 is shown. The synchronized cascaded system 100 (FIGS. 1 and 7) on which the cascaded information transfer system 500 is based may be modified as discussed above, for example, to include any number greater than 1 of multiple stable subparts.

As discussed above, the transmitter 110 is a nonlinear nonautonomous system which includes 2 non-overlapping stable subparts A and B for producing signal $S_B$ which evolves chaotically. The transmitter 110 and, in particular, subpart B, is forced by transmitter forcing signal $S_1$, produced by oscillator 115. Subsystem A drives subsystem B with signal $S_A$ and subsystem B drives subsystem A with signal $S_A$. Subsystem B is also forced by the transmitter forcing signal $S_1$.

The cascaded information transfer system 500 transmits a signal $S_{tr}$ from the transmitter 110 to the receiver 120 which signal $S_{tr}$ included information from an information signal $S_I$. The information signal $S_I$ can be externally generated.

A modulator 510 coupled to the transmitter 110 modulates signal $S_B$ with the information signal $S_I$ to produce a transmitted signal $S_{tr}$. The modulation may be linear (addition) or nonlinear, such as multiplication. The transmitter 110 transmits the transmitted signal $S_{tr}$ for driving the receiver 120.

The cascaded receiver 120 is responsive to the transmitted signal $S_{tr}$ and to a receiver forcing signal $S_2$ for producing a receiver output signal $S_{B''}$. Since the transmitted signal $S_{tr}$ is not the same as the signal $S_B$ which is produced by the nonlinear system 110, the receiver output signal $S_{B''}$ differs from the transmitted signal $S_{tr}$ and does not synchronize with it over time. The receiver output signal $S_{B''}$ may be in synchronization with the signal $S_B$ produced by the transmitter 110. However, it may not be possible for the receiver 120 to recover the signal $S_B$ produced by the transmitter 110 and modulated by the modulator 510.

The receiver 120 includes two subsystems A' and B" which are cascade connected, as described further below, and which are duplicates of subsystems A and B, respectively, of the transmitter 110.

The subsystem A' is responsive to the transmitted signal produced by the transmitter 110 and provides a response signal $S_{A'}$ to the subsystem B". The subsystem B" in turn is responsive to signal $S_{A'}$ and to a periodic receiver forcing signal $S_2$ for producing receiver output signal $S_{B''}$. The subsystems A' and B" are cascade connected in that the subsystem A' drives the subsystem B" and the subsystem B" does not directly drive the subsystem A'.

Since the transmitter 110 is a nonlinear system, the transmitted signal $S_{tr}$ contains enough phase information about the transmitter forcing signal $S_1$ so that the receiver forcing signal $S_2$ can be adjusted to bring it to the same frequency and phase (or phase-offset by a constant amount) as the transmitter forcing signal $S_1$. A phase-detector/controller 520 is responsive to the transmitted signal $S_{tr}$ and to the receiver output signal $S_{B''}$ for producing a correction signal $S_{corr}$ dependent on the phase difference between the transmitted signal $S_{tr}$ and the receiver output signal $S_{B''}$. The device 520 is also an error detector for comparing the receiver output signal $S_{B''}$ with the transmitted signal $S_{tr}$ to produce an error signal $S_{err}$ indicative of the information contained in the information signal $S_I$.

The error detector 520 can perform simple subtraction. The error detector 520 can also strobe the output of the response $S_{B''}$ with the drive signal $S_{tr}$ and average the strobed values to produce a resulting averaged signal proportional in magnitude and sign to the original information signal $S_I$. Other examples of methods for the error detection circuit 520 to compare response signal $S_{B''}$ with the transmitted signal $S_{tr}$ to produce an error signal $S_{err}$ that can be used with the present invention are related to standard phase detection techniques generally used for periodic linear systems.

As in the synchronization system 100 shown in FIGS. 1 and 7, a signal generator 140, such as a voltage controlled oscillator or tracking oscillator used in phase locked circuits, is responsive to the correction signal $S_{corr}$. The subsystem 140 uses the comparison signal $S_{comp}$ to correct the phase of the receiver forcing signal $S_2$, for example, by delaying the forcing signal $S_2$, so that it matches the transmitter forcing signal $S_1$.

Figure 16:
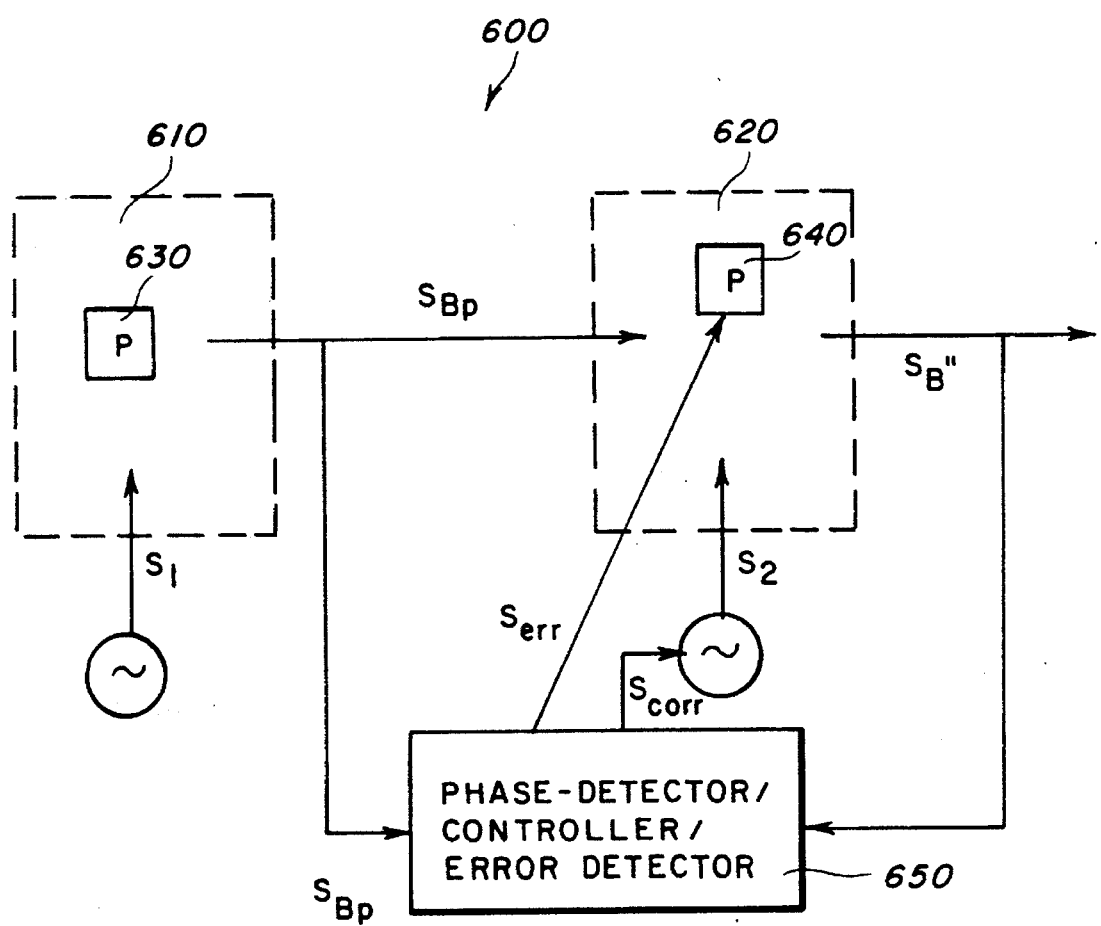
FIG. 16 is a general block diagram of an information transfer system for transferring information regarding parameter variation.

Referring now to FIG. 16, an information transfer system 600 is shown in which the information being transferred from the transmitter 610 to the receiver 620 is internal to the transmitter 610. For example, the information being transferred is the value of a parameter P, such as a resistance. The transmitter 610 has the same properties as the transmitter 110 discussed above: it is nonlinear, non-autonomous, being forced by a transmitter forcing signal $S_1$, and divided into at least two stable, non-overlapping subparts for producing and transmitting transmitted signal $S_{Bp}$ modified by the parameter P. It also has a subsystem 630 for adjusting the parameter P. The receiver 620 is a cascaded receiver as described above, including having duplicates of the subparts of the transmitter 610. It is responsive to transmitted signal $S_{Bp}$ and to a receiver forcing signal $S_2$ for producing a receiver output signal $S_{B''}$. The receiver 620 optionally includes a subsystem 640 for adjusting the parameter P. A phase-detector/controller 650 responsive to the transmitted signal $S_{Bp}$ and to the receiver output signal $S_{B''}$ produces a correction signal $S_{corr}$ dependent on the phase difference between the transmitted signal $S_{Bp}$ and to the receiver output signal $S_{B''}$. This correction signal $S_{corr}$ is used to adjust the phase of the receiver forcing signal $S_2$. An error detector 650 compares the signal $S_{B''}$ with the transmitted signal $S_{tr}$ and produces an error signal $S_{err}$ indicative of the difference between the parameter P in the transmitter 610 and the parameter P in the receiver 620.

The parameter P in the receiver 620 can be fixed, in which case the error signal $S_{err}$ is indicative of the parameter value P in the transmitter 610. Alternatively, the receiver 620 and, in particular, the parameter subsystem 640 is responsive to the error signal $S_{err}$ for adjusting the parameter P in the receiver 620. As a result, the parameter P in the receiver 620 tracks the parameter P in the transmitter 610, and the receiver output signal $S_{B''}$ is in synchronization with the transmitted signals $S_{Bp}$.

The information transfer system 500 or 600 according to the present invention (see FIGS. 15 and 16) are the same as the synchronization system 400 or 500 (see FIGS. 1, 7 and 14) except that for the information transfer system, the transmitted signal $S_{tr}$ or $S_{Bp}$ is not the same as the communication signal $S_B$ or $S_{EC}$, and the information transfer system includes an error detector for detecting the information transferred. All of the modifications discussed above for the synchronized system applies equally well to the information transfer system.

Time scale considerations are relevant to the practice of this invention. The transmitter 110 itself has the shortest time scale, on the order of the forcing signal $S_1$ period. For the example shown in FIGS. 1, 3–5 and 8, the time scale of the circuit is on the order of ~0.1–1 millisecond (msec). Oscillators 115 and 140 generally provide stable frequencies, but have slow phase drifts. The synchronized systems 100 and 400 and the information transfer systems 500 and 600 detect phase shifts considerably slower than the circuit time scale. For the example shown in FIGS. 1, 3–5, 8, 15 and 16, the system can detect phase shifts as fast as about 0.1–1 second. If the phase-detector/controller 130 of FIG. 13 is used, the system can detect phase shifts about 100 times faster, as fast as about 1–10 msec. The time scale for information detectable by the information transfer system 500 and 600 is in between the circuit time scale and the phase shift time scale. Information that fluctuates as slow as the forcing signal phase shift may not be distinguishable from the latter, whereas information that fluctuates as fast as the circuit time scale may not be detectable.

The foregoing descriptions of the preferred embodiments are intended to be illustrative and not limiting. It will be appreciated that numerous modifications and variations can be made without departing from the spirit or scope of the present invention.

What is claimed is:

1. A cascaded synchronized system comprising:

(a) a nonlinear transmitter responsive to a transmitter forcing signal for producing and transmitting a chaotic communications signal containing phase information;

(b) a nonlinear cascaded receiver responsive to a receiver forcing signal and the communications signal for producing a receiver output signal;

(c) a phase-detector/controller coupled to said receiver (b) being responsive to the communications signal for producing a correction signal; and (d) a signal generator coupled to said receiver (b) being responsive to the correction signal for producing the receiver forcing signal in phase with and having the same frequency as the transmitter forcing signal.

2. The system of claim 1 wherein said receiver (b) produces the receiver output signal in synchronization with the communications signal.

3. The system of claim 1 wherein:

said transmitter (a) comprises stable first and second subparts, said first subpart being responsive to the communications signal for producing a first transmitter signal, said second subpart being responsive to the transmitter forcing signal and the first transmitter signal for producing the chaotic communications signal; and said receiver (b) comprises first and second stages which are duplicates of said first and second subparts of said transmitter (a), respectively, said first stage being responsive to the communications signal for producing a first receiver signal, said second stage being responsive to the first receiver signal and the receiver forcing signal for producing the receiver output signal.

4. The system of claim 2 wherein:

said transmitter (a) comprises stable first and second subparts, said first subpart being responsive to the transmitter forcing signal and the communications signal for producing a first transmitter signal, said second subpart being responsive to the first transmitter signal for producing the chaotic communications signal; and said receiver (b) comprises first and second stages which are duplicates of said first and second subparts of said transmitter (a), respectively, said first stage being responsive to the receiver forcing signal and the communications signal for producing a first receiver signal, said second stage being responsive to the first receiver signal for producing the receiver output signal.

5. The system of claim 3 wherein:

said first subpart of said transmitter (a) is responsive to the transmitter forcing signal for producing the first transmitter signal; and said first stage of said receiver (b) is responsive to the receiver forcing signal for producing the first receiver signal.

6. The system of claim 1 wherein:

said receiver (b) comprises means for producing the receiver output signal having phase information; and said phase-detector/controller (c) comprises means responsive to the receiver output signal for producing the correction signal indicative of the phase difference between the transmitter forcing signal and the receiver forcing signal.

7. The system of claim 6 wherein said phase-detector/controller (c) comprises a sample and hold circuit.

8. The system of claim 7 wherein said phase-detector/controller (c) comprises a bandpass filter.

9. The system of claim 1 wherein:

said receiver (b) comprises means for producing a receiver signal having phase information; and said phase-detector/controller (c) comprises means responsive to the receiver signal for producing the correction signal indicative of the phase difference between the transmitter forcing signal and the receiver forcing signal.

10. The system of claim 1 further comprising:

(e) means for producing a periodic reference signal; and (f) a phase comparator coupled to said receiver (b) being responsive to the periodic reference signal and the receiver forcing signal for producing a comparison signal;

wherein said signal generator (d) is responsive to the comparison signal.

11. A cascaded information transfer system comprising:

(a) a nonlinear transmitter responsive to an information signal and a transmitter forcing signal for producing and transmitting a transmitted signal;

(b) a nonlinear cascaded receiver responsive to a receiver forcing signal and the transmitted signal for producing a receiver output signal;

(c) a phase-detector/controller coupled to said receiver (b) being responsive to the transmitted signal for producing a correction signal;

(d) a signal generator coupled to said receiver (b) being responsive to the correction signal for producing the receiver forcing signal in phase with and having the same frequency as the transmitter forcing signal; and (e) an error detector responsive to the transmitted signal and the receiver output signal for producing an error signal containing information contained in the information signal.

12. The system of claim 11 wherein said transmitter (a) comprises:

means for producing a chaotic communications signal; and a modulator responsive to the communications signal and the information signal for producing the transmitted signal.

13. The system of claim 12 wherein said modulator comprises a nonlinear modulator.

14. The system of claim 12 wherein:

said transmitter (a) comprises stable first and second subparts, said first subpart being responsive to the communications signal for producing a first transmitter signal, said second subpart being responsive to the transmitter forcing signal and the first transmitter signal for producing the communications signal; and said receiver (b) comprises first and second stages which are duplicates of said first and second subparts of said transmitter (a), respectively, said first stage being responsive to the transmitted signal for producing a first receiver signal, said second stage being responsive to the first receiver signal and the receiver forcing signal for producing the receiver output signal.

15. The system of claim 12 wherein:

said transmitter (a) comprises stable first and second subparts, said first subpart being responsive to the transmitter forcing signal and the communications signal for producing a first transmitter signal, said second subpart being responsive to the first transmitter signal for producing the communications signal; and said receiver (b) comprises first and second stages which are duplicates of said first and second subparts of said transmitter (a), respectively, said first stage being responsive to the receiver forcing signal and the transmitted signal for producing a first receiver signal, said second stage being responsive to the first receiver signal for producing the receiver output signal.

16. The system of claim 14 wherein:

said first subpart of said transmitter (a) is responsive to the transmitter forcing signal for producing the first transmitter signal; and said first stage of said receiver (b) is responsive to the receiver forcing signal for producing the first receiver signal.

17. The system of claim 11 wherein:

said receiver (b) comprises means for producing the receiver output signal having phase information; and said phase-detector/controller (c) comprises means responsive to the receiver output signal for producing the correction signal indicative of the phase difference between the transmitter forcing signal and the receiver forcing signal.

18. The system of claim 17 wherein said phase-detector/ controller (c) comprises a sample and hold circuit.

19. The system of claim 17 wherein said phase-detector/ controller (c) comprises a bandpass filter.

20. The system of claim 11 wherein:

said receiver (b) comprises means for producing a receiver signal having phase information; and said phase-detector/controller (c) comprises means responsive to the receiver signal for producing the correction signal indicative of the phase difference between the transmitter forcing signal and the receiver forcing signal.

21. The system of claim 11 further comprising:

(a) means for producing a periodic reference signal; and (b) a phase comparator coupled to said receiver (b) being responsive to the periodic reference signal and the receiver forcing signal for producing a comparison signal;

wherein said signal generator (d) is responsive to the comparison signal.

* * * * *